US011871320B2

(12) United States Patent
Wei et al.

(10) Patent No.: US 11,871,320 B2
(45) Date of Patent: Jan. 9, 2024

(54) INFORMATION PROCESSING METHOD AND DEVICE

(71) Applicant: PETAL CLOUD TECHNOLOGY CO., LTD., Dongguan (CN)

(72) Inventors: Quanshui Wei, Nanjing (CN); Cheng Liu, Shenzhen (CN)

(73) Assignee: PETAL CLOUD TECHNOLOGY CO., LTD., Dongguan (CN)

(*) Notice: Subject to any disclaimer, the term of this patent is extended or adjusted under 35 U.S.C. 154(b) by 63 days.

(21) Appl. No.: 17/615,397

(22) PCT Filed: May 26, 2020

(86) PCT No.: PCT/CN2020/092298
§ 371 (c)(1),
(2) Date: Nov. 30, 2021

(87) PCT Pub. No.: WO2020/238890
PCT Pub. Date: Dec. 3, 2020

(65) Prior Publication Data
US 2022/0232360 A1  Jul. 21, 2022

(30) Foreign Application Priority Data

May 30, 2019 (CN) .......................... 201910465722.7

(51) Int. Cl.
*H04W 4/70* (2018.01)
*H04M 1/72454* (2021.01)
(Continued)

(52) U.S. Cl.
CPC ......... *H04W 4/70* (2018.02); *H04M 1/72436* (2021.01); *H04M 1/72454* (2021.01);
(Continued)

(58) Field of Classification Search
CPC ......... H04W 4/70; H04W 4/021; H04W 4/20; H04M 1/72436; H04M 1/72454; H04M 1/72469; H04M 1/72448; H04L 67/55
See application file for complete search history.

(56) References Cited

U.S. PATENT DOCUMENTS

2005/0164748 A1   7/2005  Kitaji
2012/0188147 A1*  7/2012  Hosein ............. H04N 21/42224
                                                    345/2.2
(Continued)

FOREIGN PATENT DOCUMENTS

CN    101888436 A    11/2010
CN    103338254 A    10/2013
(Continued)

OTHER PUBLICATIONS

Extended European Search Report issued in corresponding European Application No. 20815651.3, dated May 31, 2022, pp. 1-10.
(Continued)

*Primary Examiner* — Farid Seyedvosoghi
(74) *Attorney, Agent, or Firm* — HAUPTMAN HAM, LLP

(57) ABSTRACT

Embodiments of this application relate to the field of communications technologies, and provide an information processing method and a device, to resolve a problem that activity information of an application on a terminal device cannot be obtained when the terminal device runs out of power. The method includes: A first terminal device obtains activity information of an application on the first terminal device when a battery level of the first terminal device is less than or equal to a first threshold. The first terminal device determines a second terminal device, where the second terminal device is a terminal device selected from an available device, the available device is an online device that uses a same user account as the first terminal device, and a battery (Continued)

level of the available device is greater than or equal to a second threshold. The first terminal device pushes the activity information of the application on the first terminal device to the second terminal device.

17 Claims, 15 Drawing Sheets

(51) Int. Cl.
*H04M 1/72436* (2021.01)
*H04M 1/72469* (2021.01)
*H04W 4/021* (2018.01)
*H04W 4/20* (2018.01)

(52) U.S. Cl.
CPC ....... *H04M 1/72469* (2021.01); *H04W 4/021* (2013.01); *H04W 4/20* (2013.01)

(56) References Cited

U.S. PATENT DOCUMENTS

| | | | | |
|---|---|---|---|---|
| 2015/0099505 | A1* | 4/2015 | Kiukkonen | H04M 1/72454 455/419 |
| 2016/0174156 | A1 | 6/2016 | Fu et al. | |
| 2018/0176365 | A1* | 6/2018 | Jung | H04M 1/72445 |

FOREIGN PATENT DOCUMENTS

| | | | | |
|---|---|---|---|---|
| CN | 104200353 | A | | 12/2014 |
| CN | 104572193 | A | * | 4/2015 |
| CN | 104572193 | A | | 4/2015 |
| CN | 104731823 | A | | 6/2015 |
| CN | 105573845 | A | | 5/2016 |
| CN | 105636191 | A | | 6/2016 |
| CN | 106293706 | A | | 1/2017 |
| CN | 107070945 | A | | 8/2017 |
| CN | 107886303 | A | | 4/2018 |
| CN | 110401767 | A | | 11/2019 |
| KR | 20160143815 | A | * | 12/2016 ............. H04L 63/08 |

OTHER PUBLICATIONS

Chinese Office Action issued in corresponding Chinese Application No. 201910465722.7, dated Mar. 12, 2020, pp. 1-8.
Chinese Office Action issued in corresponding Chinese Application No. 201910465722.7, dated Oct. 10, 2020, pp. 1-7.
Notice of Allowance issued in corresponding Chinese Application No. 201910465722.7, dated Jun. 7, 2021, pp. 1-4.
International Search Report issued in corresponding International Application No. PCT/CN2020/092298, dated Aug. 14, 2020, pp. 1-11.

* cited by examiner

INFORMATION PROCESSING METHOD AND DEVICE

The present application is a U.S. National Phase of International Application Number PCT/CN2020/092298, filed May 26, 2020, which claims priority to Chinese Patent Application No. 201910465722.7, filed May 30, 2019, both of which are hereby incorporated by reference in their entireties.

TECHNICAL FIELD

This application relates to the field of communications technologies, and in particular, to an information processing method and a device.

BACKGROUND

Currently, there are increasing types of terminal devices, for example, a mobile phone, a tablet computer, a smartwatch, and a smart band. The mobile phone has become an indispensable electronic device in people's life. Various activities can be performed through the mobile phone, such as buying a movie ticket, setting a reminder, and reading an ebook. However, when the mobile phone runs out of power, various activities that can be performed through the mobile phone cannot be performed. Consequently, user experience is affected.

SUMMARY

Embodiments of this application provide an information processing method and a device, to resolve a problem that activity information of an application on a terminal device cannot be obtained when the terminal device runs out of power.

To achieve the foregoing objective, the following technical solutions are used in the embodiments of this application.

According to a first aspect, an embodiment of this application provides an information processing method. The method includes: A first terminal device obtains an information list when a battery level of the first terminal device is less than or equal to a first threshold, where the information list includes activity information of an application on the first terminal device. The first terminal device determines a second terminal device, where the second terminal device is a terminal device selected from an available device, the available device is an online device that uses a same user account as the first terminal device, and a battery level of the available device is greater than or equal to a second threshold. The first terminal device pushes the information list to the second terminal device.

According to the technical solution provided in the first aspect, when the battery level of the first terminal device is less than or equal to the first threshold, the first terminal device may determine the second terminal device, and push the activity information of the application on the first terminal device to the second terminal device. This resolves a problem that activity information of an application on a terminal device cannot be obtained when the terminal device runs out of power.

With reference to the first aspect, in a first possible implementation, that a first terminal device obtains an information list includes: The first terminal device obtains activity information of N applications on the first terminal device, where the activity information of the N applications includes activity locations, activity time, and activity content, and N is a positive integer. The first terminal device selects, from the activity information of the N applications, activity information including activity time that is within first preset time and an activity location that has a distance to a geographical location of the first terminal device less than or equal to a third threshold. The first terminal device obtains the information list based on the selected activity information. According to the technical solution provided in the first possible implementation of the first aspect, the first terminal device may obtain the activity information of the N applications on the first terminal device, select, from the activity information of the N applications, the activity information including the activity time that is within the first preset time and the activity location that has the distance to the geographical location of the first terminal device less than or equal to the third threshold, and obtain the information list based on the selected activity information.

With reference to the first possible implementation of the first aspect, in a second possible implementation, that the first terminal device obtains the information list based on the selected activity information includes: The first terminal device displays first prompt information in a user interface of the first terminal device, where the first prompt information is used to prompt a user about the activity information selected by the first terminal device. The first terminal device receives first acknowledgment information from the user, where the first acknowledgment information includes the information list. According to the technical solution provided in the second possible implementation of the first aspect, the first terminal device may display, in the user interface of the first terminal device, the activity information selected by the first terminal device, and determine the information list based on a selection of the user.

With reference to the first possible implementation of the first aspect and the second possible implementation of the first aspect, in a third possible implementation, the N applications are N frequently-used applications, or the N applications are N user-defined applications. According to the technical solution provided in the third possible implementation of the first aspect, the first terminal device may obtain the information list based on activity information of the N frequently-used applications on the first terminal device, or the first terminal device may obtain the information list based on activity information of the N user-defined applications.

With reference to the first aspect and the possible implementations of the first aspect, in a fourth possible implementation, before the first terminal device obtains the information list, the method further includes: The first terminal device displays second prompt information in the user interface of the first terminal device, where the second prompt information is used to prompt the user to push the information list to another terminal device. The first terminal device receives a second acknowledgment message from the user, where the second acknowledgment message is used to indicate the first terminal device to obtain the information list. According to the technical solution provided in the fourth possible implementation of the first aspect, the first terminal device may determine, based on a selection of the user, whether to push the activity information of the application on the first terminal device to another terminal device.

With reference to the first aspect and the possible implementations of the first aspect, in a fifth possible implementation, the first terminal device sends query information to an account server, where the query information is used to query for an available device; the first terminal device receives query response information sent by the account server, where the query response information includes a device list, and the device list includes information about the available device; and the first terminal device determines the second terminal device based on the query response information. According to the technical solution provided in the fifth possible implementation of the first aspect, the first terminal device may query for an available device from the account server, and determine the second terminal device.

With reference to the fifth possible implementation of the first aspect, in a sixth possible implementation, that the first terminal device determines the second terminal device based on the query response information includes: If the device list includes information about one available device, and a battery level of the available device is greater than or equal to the second threshold, the first terminal device determines that the available device is the second terminal device. If the device list includes information about two or more available devices, the first terminal device determines the second terminal device based on geographical locations of the two or more available devices and/or battery levels of the two or more available devices. According to the technical solution provided in the sixth possible implementation of the first aspect, the first terminal device may determine the second terminal device based on a battery level of an available device and/or a geographical location of the available device.

With reference to the first aspect and the possible implementations of the first aspect, in a seventh possible implementation, that the first terminal device pushes the information list to the second terminal device includes: The first terminal device sends first information to the account server, where the first information includes the information list, the first information is used to indicate the account server to send second information to a message push server, the second information is used to indicate the message push server to send third information to the second terminal device, and the third information is used to indicate the second terminal device to obtain the information list from the account server; and the account server is configured to manage terminal devices that use the same user account, and the message push server is configured to push a message to a terminal device. According to the technical solution provided in the seventh possible implementation of the first aspect, the first terminal device may send the first information to the account server, the account server sends the second information to the message push server, and the message push server sends the third information to the second terminal device, so that the first terminal device pushes the activity information of the application on the first terminal device to the second terminal device.

According to a second aspect, an embodiment of this application provides a first terminal device. The first terminal device includes an obtaining module, a determining module, and a push module. The obtaining module is configured to obtain an information list when a battery level of the first terminal device is less than or equal to a first threshold, where the information list includes activity information of an application on the first terminal device. The determining module is configured to determine a second terminal device, where the second terminal device is a terminal device selected from an available device, the available device is an online device that uses a same user account as the first terminal device, and a battery level of the available device is greater than or equal to a second threshold. The push module is configured to push the information list to the second terminal device.

According to the technical solution provided in the second aspect, when the battery level of the first terminal device is less than or equal to the first threshold, the first terminal device may determine the second terminal device, and push the activity information of the application on the first terminal device to the second terminal device. This resolves a problem that activity information of an application on a terminal device cannot be obtained when the terminal device runs out of power.

With reference to the second aspect, in a first possible implementation, the obtaining module is specifically configured to obtain activity information of N applications on the first terminal device, where the activity information of the N applications includes activity locations, activity time, and activity content, and N is a positive integer. The obtaining module is further specifically configured to select, from the activity information of the N applications, activity information including activity time that is within first preset time and an activity location that has a distance to a geographical location of the first terminal device less than or equal to a third threshold. The obtaining module is further specifically configured to obtain the information list based on the selected activity information. According to the technical solution provided in the first possible implementation of the second aspect, the first terminal device may obtain the activity information of the N applications on the first terminal device, select, from the activity information of the N applications, the activity information including the activity time that is within the first preset time and the activity location that has the distance to the geographical location of the first terminal device less than or equal to the third threshold, and obtain the information list based on the selected activity information.

With reference to the first possible implementation of the second aspect, in a second possible implementation, the obtaining module is further specifically configured to display first prompt information in a user interface of the first terminal device, where the first prompt information is used to prompt a user about the activity information selected by the first terminal device. The obtaining module is further specifically configured to receive first acknowledgment information from the user, where the first acknowledgment information includes the information list. According to the technical solution provided in the second possible implementation of the second aspect, the first terminal device may display, in the user interface of the first terminal device, the activity information selected by the first terminal device, and determine the information list based on a selection of the user.

With reference to the first possible implementation of the second aspect and the second possible implementation of the second aspect, in a third possible implementation, the N applications are N frequently-used applications; or the N applications are N user-defined applications. According to the technical solution provided in the third possible implementation of the second aspect, the first terminal device may obtain the information list based on activity information of the N frequently-used applications on the first terminal device, or the first terminal device may obtain the information list based on activity information of the N user-defined applications.

With reference to the second aspect and the possible implementations of the second aspect, in a fourth possible implementation, the first terminal device further includes a display module and a receiving module. The display module is configured to display second prompt information in the user interface of the first terminal device, where the second prompt information is used to prompt the user to push the information list to another terminal device. The receiving module is configured to receive a second acknowledgment message from the user, where the second acknowledgment message is used to indicate the first terminal device to obtain the information list. According to the technical solution provided in the fourth possible implementation of the second aspect, the first terminal device may determine, based on a selection of the user, whether to push the activity information of the application on the first terminal device to another terminal device.

With reference to the second aspect and the possible implementations of the second aspect, in a fifth possible implementation, the determining module is specifically configured to send query information to an account server, where the query information is used to query for an available device. The determining module is further specifically configured to receive query response information sent by the account server, where the query response information includes a device list, and the device list includes information about the available device. The determining module is further specifically configured to determine the second terminal device based on the query response information. According to the technical solution provided in the fifth possible implementation of the second aspect, the first terminal device may query for an available device from the account server, and determine the second terminal device.

With reference to the fifth possible implementation of the second aspect, in a sixth possible implementation, the determining module is further specifically configured to: if the device list includes information about one available device, and a battery level of the available device is greater than or equal to the second threshold, determine that the available device is the second terminal device. The determining module is further specifically configured to: if the device list includes information about two or more available devices, determine the second terminal device based on geographical locations of the two or more available devices and/or battery levels of the two or more available devices. According to the technical solution provided in the sixth possible implementation of the second aspect, the first terminal device may determine the second terminal device based on a battery level of an available device and/or a geographical location of the available device.

With reference to the second aspect and the possible implementations of the second aspect, in a seventh possible implementation, the push module is specifically configured to send first information to the account server, where the first information includes the information list, the first information is used to indicate the account server to send second information to a message push server, the second information is used to indicate the message push server to send third information to the second terminal device, and the third information is used to indicate the second terminal device to obtain the information list from the account server; and the account server is configured to manage terminal devices that use the same user account, and the message push server is configured to push a message to a terminal device. According to the technical solution provided in the seventh possible implementation of the second aspect, the first terminal device may send the first information to the account server, the account server sends the second information to the message push server, and the message push server sends the third information to the second terminal device, so that the first terminal device pushes the activity information of the application on the first terminal device to the second terminal device.

According to a third aspect, an embodiment of this application provides a terminal device, including at least one processor, at least one memory, and a communications interface. The communications interface and the at least one memory are coupled to the at least one processor. The terminal device communicates with another device through the communications interface. The at least one memory is configured to store a computer program. The computer program is executed by the at least one processor, to implement the information processing method according to the first aspect and the possible implementations of the first aspect.

According to a fourth aspect, this application provides a system chip. The system chip may be applied to a terminal device. The system chip includes at least one processor. Related program instructions are executed by the at least one processor, so that the terminal device on which the system chip is installed implements a function of user equipment in the method according to any one of the first aspect and the designs of the first aspect. Optionally, the system chip may further include at least one memory. The memory stores the related program instructions.

According to a fifth aspect, an embodiment of this application provides a computer-readable storage medium, for example, a non-transient readable storage medium of a computer. The computer-readable storage medium stores a computer program. When the computer program is run on a terminal device, the terminal device is enabled to perform any possible method in the first aspect. For example, the computer may be at least one storage node.

According to a sixth aspect, an embodiment of this application provides a computer program product. The computer program product is run on a computer, to perform the method provided in the first aspect. For example, the computer may be at least one storage node or a communications apparatus.

It may be understood that any terminal device, system chip, computer storage medium, computer program product, or the like provided above is configured to perform a corresponding method provided above. Therefore, for beneficial effects that can be achieved by the any terminal device, system chip, computer storage medium, or computer program product, refer to the beneficial effects in the corresponding method. Details are not described herein.

DETAILED DESCRIPTION OF EMBODIMENTS

Figure 1:
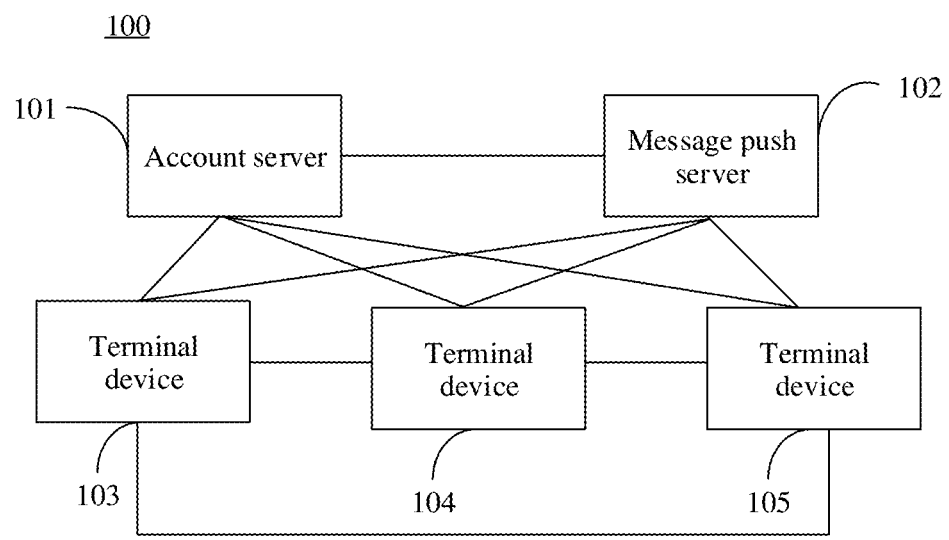
FIG. 1 is a schematic diagram of an architecture of an information processing system according to an embodiment of this application.

FIG. 1 is a schematic architectural diagram of an information processing system 100 according to an embodiment of this application. In FIG. 1, the information processing system 100 includes an account server 101, a message push server 102, and a terminal device 103 to a terminal device 105.

The account server 101 is configured to manage terminal devices that use a same user account, and may provide information of a terminal device, for example, an identifier of the terminal device or a battery level of the terminal device, for the message push server 102, the terminal device 103, the terminal device 104, and the terminal device 105.

The message push server 102 is configured to push a message to the terminal device 103, the terminal device 104, and the terminal device 105.

The terminal device 103 to the terminal device 105 may be a portable computer (for example, a mobile phone), a wearable electronic device (for example, a smartwatch), a tablet computer, or the like.

The account server 101 in FIG. 1 may communicate with the message push server 102, the terminal device 103, the terminal device 104, and the terminal device 105. For example, the account server 101 may send an identifier of the terminal device 105 to the message push server 102. For another example, if the terminal device 103 and the terminal device 104 are devices that use the same user account, the account server 101 may provide the terminal device 103 with an identifier of the terminal device 104 and/or a battery level of the terminal device 104. The account server 101 may also provide the terminal device 104 with an identifier of the terminal device 103 and/or a battery level of the terminal device 103.

A terminal device in FIG. 1 may communicate with another terminal device via the account server 101 and the message push server 102. For example, the terminal device 103 sends an information list to the terminal device 104. The terminal device 103 may first send the information list to the account server 101. After receiving the information list, the account server 101 may send a push message to the message push server 102, where the push message may be used to indicate the message push server 102 to send a notification message to the terminal device 104, so that the terminal device 104 obtains the information list from the account server 101 after receiving the notification message.

A terminal device in FIG. 1 may alternatively communicate with another terminal device through Bluetooth. For example, the terminal device 103 communicates with the terminal device 104 through Bluetooth.

It should be noted that, the information processing system 100 shown in FIG. 1 is merely used as an example, but not intended to limit the technical solutions of this application. A person skilled in the art should understand that, in a specific implementation process, the information processing system 100 may further include another device, and a quantity of the account servers, the message push servers, and the terminal devices may be determined based on a specific requirement.

Optionally, the terminal device 103, the terminal device 104, or the terminal device 105 in FIG. 1 in this embodiment of this application may be a functional module in a device. It may be understood that the foregoing function may be an element in a hardware device, for example, a chip in a mobile phone, or may be a software function running on dedicated hardware.

Figure 2:
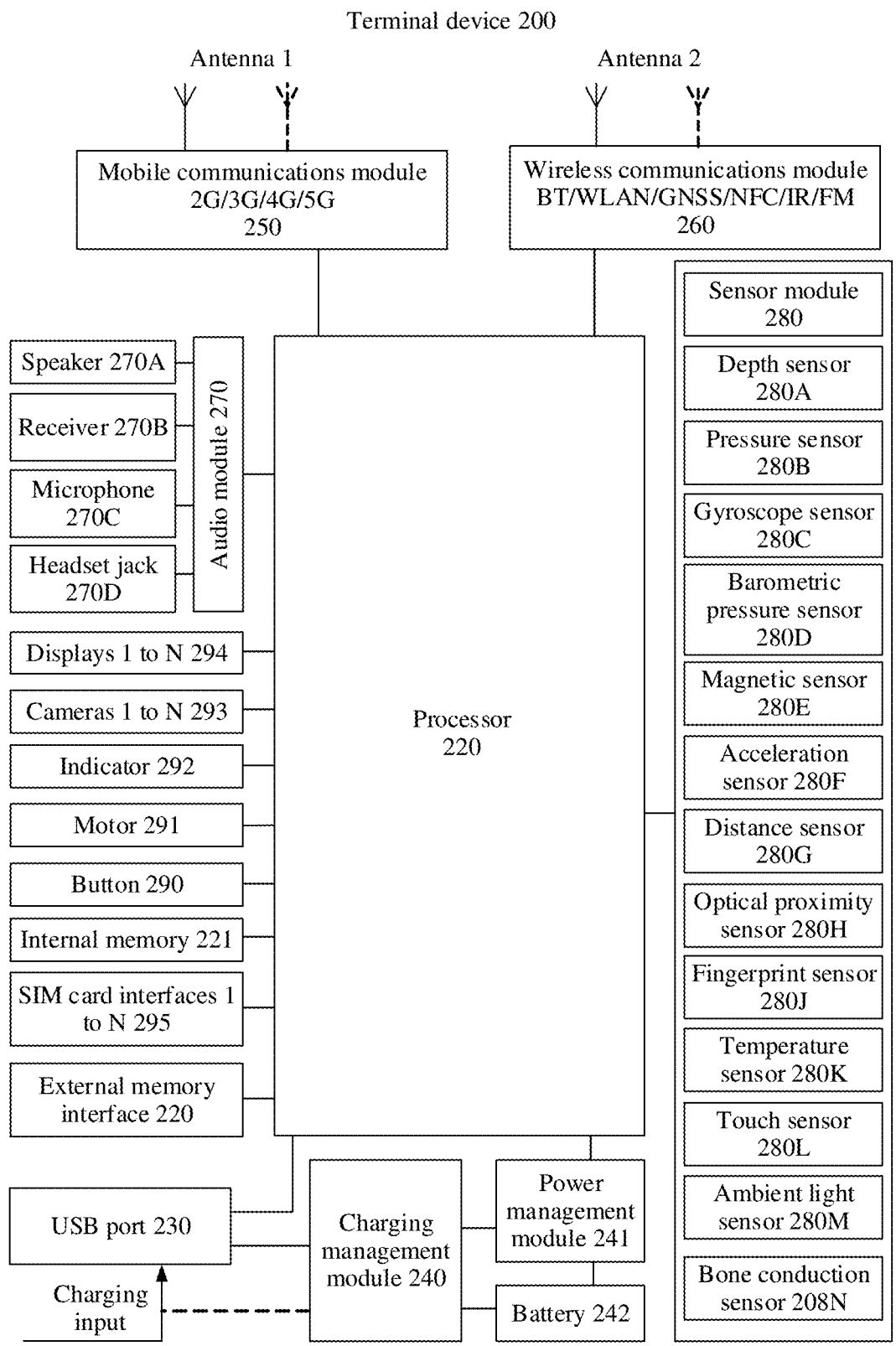
FIG. 2 is a schematic diagram of a structure of a terminal device according to an embodiment of this application.

For example, the terminal device 103, the terminal device 104, or the terminal device 105 in FIG. 1 each may be implemented by a terminal device 200 in FIG. 2. FIG. 2 is a schematic structural diagram of a terminal device according to an embodiment of this application. The terminal device 200 in FIG. 2 may include a processor 210, an external memory interface 220, an internal memory 221, a universal serial bus (universal serial bus, USB) port 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (subscriber identification module, SIM) card interface 295, and the like. The sensor module 280 may include a depth sensor 280A, a pressure sensor 280B, a gyroscope sensor 280C, a barometric pressure sensor 280D, a magnetic sensor 280E, an acceleration sensor 280F, a distance sensor 280G, an optical proximity sensor 280H, a fingerprint sensor 280J, a temperature sensor 280K, a touch sensor 280L, an ambient light sensor 280M, a bone conduction sensor 280N, and the like.

It may be understood that a structure shown in this embodiment of this application does not constitute a specific limitation on the terminal device 200. In some other embodiments of this application, the terminal device 200 may include more or fewer components than those shown in the figure, or some components may be combined, or some components may be split, or different component arrangements may be used. The components shown in the figure may be implemented by using hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (Neural-network Processing Unit, NPU). Different processing units may be independent components, or may be integrated into one or more processors.

The controller may generate an operation control signal based on an instruction operation code and a time sequence signal, to control instruction reading and instruction execution.

A memory may be further disposed in the processor 210, and is configured to store instructions and data. The memory may store instructions used to implement six modular functions: a detection instruction, a connection instruction, an information management instruction, an analysis instruction, a data transmission instruction, and a notification instruction, and the processor 210 controls execution of the instructions. In some embodiments, the memory in the processor 210 is a cache memory. The memory may store instructions or data that has just been used or is cyclically used by the processor 210. If the processor 210 needs to use the instructions or the data again, the processor 210 may directly invoke the instructions or the data from the memory, to avoid repeated access and reduce waiting time of the processor 210. Therefore, system efficiency is improved.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes a serial data line (serial data line, SDA) and a serial clock line (derail clock line, SCL). In some embodiments, the processor 210 may include a plurality of groups of I2C buses. The processor 210 may be separately coupled to the touch sensor 280K, a charger, a flashlight, the camera 293, and the like through different I2C bus interfaces. For example, the processor 210 may couple to the touch sensor 280K through an I2C interface, so that the processor 210 communicates with the touch sensor 280K through the I2C bus interface, to implement a touch function of the terminal device 200.

The I2S interface may be configured to perform audio communication. In some embodiments, the processor 210 may include a plurality of groups of I2S buses. The processor 210 may be coupled to the audio module 270 through an I2S bus, to implement communication between the processor 210 and the audio module 270. In some embodiments, the audio module 270 may transfer an audio signal to the wireless communications module 260 through the I2S interface, to implement a function of answering a call by using a Bluetooth headset.

The PCM interface may also be configured to: perform audio communication, and sample, quantize, and code an analog signal. In some embodiments, the audio module 270 may be coupled to the wireless communications module 260 through a PCM bus interface. In some embodiments, the audio module 270 may alternatively transfer an audio signal to the wireless communications module 260 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 210 and the wireless communications module 260. For example, the processor 210 communicates with a Bluetooth module in the wireless communications module 260 through the UART interface, to implement a Bluetooth function. In some embodiments, the audio module 270 may transfer an audio signal to the wireless communications module 260 through the UART interface, to implement a function of playing music by using a Bluetooth headset.

The MIPI interface may be configured to connect the processor 210 to a peripheral component such as the display 294 or the camera 293. The MIPI interface includes a camera serial interface (camera serial interface, CSI), a display serial interface (display serial interface, DSI), or the like. In some embodiments, the processor 210 communicates with the camera 293 through the CSI interface, to implement a photographing function of the terminal device 200. The processor 210 communicates with the display 294 through the DSI interface, to implement a display function of the terminal device 200.

The GPIO interface may be configured by using software. The GPIO interface may be configured as a control signal or a data signal. In some embodiments, the GPIO interface may be configured to connect the processor 210 to the camera 293, the display 294, the wireless communications module 260, the audio module 270, the sensor module 280, and the like. The GPIO interface may alternatively be configured as the I2C interface, the I2S interface, the UART interface, the MIPI interface, or the like.

The USB port 230 is an interface that conforms to a USB standard specification, and may be specifically a mini USB port, a micro USB port, a USB Type-C port, or the like. The USB port 230 may be configured to be connected to a charger for charging the terminal device 200, or may be configured to transmit data between the terminal device 200 and a peripheral device, or may be configured to be connected to a headset, to play audio by using a headset. The interface may alternatively be configured to be connected to another terminal device such as an AR device.

It may be understood that an interface connection relationship between the modules shown in this embodiment of the present invention is merely used as an example for description, and does not constitute a limitation on the structure of the terminal device 200. In some other embodiments of this application, the terminal device 200 may alternatively use an interface connection manner different from an interface connection manner in the foregoing embodiment, or use a combination of a plurality of interface connection manners.

The charging management module 240 is configured to receive a charging input from the charger. The charger may be a wireless charger or a wired charger. In some embodiments of wired charging, the charging management module 240 may receive a charging input of the wired charger through the USB interface 230. In some embodiments in which wireless charging is used, the charging management module 240 may receive a wireless charging input by using a wireless charging coil of the terminal device 200. The charging management module 240 may further supply power to the terminal device by using the power management module 241 while charging the battery 242.

The power management module 241 is configured to connect the battery 242 and the charging management module 240 to the processor 210. The power management module 241 receives an input from the battery 242 and/or the charging management module 240, and supplies power to the processor 210, the internal memory 221, the display 294, the camera 293, the wireless communications module 260, and the like The power management module 241 may be further configured to monitor parameters such as a battery capacity, a battery cycle count, and a battery health status (an electric leakage or impedance). In some other embodiments, the power management module 241 may alternatively be disposed in the processor 210. In some other embodiments, the power management module 241 and the charging management module 240 may alternatively be disposed in a same device.

A wireless communication function of the terminal device 200 may be implemented by using the antenna 1, the antenna 2, the mobile communications module 250, the wireless communications module 260, the modem processor, the baseband processor, and the like.

The antenna 1 and the antenna 2 are configured to: transmit and receive electromagnetic wave signals. Each antenna of the terminal device 200 may be configured to include a single communications frequency band or a plurality of communications frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 250 may provide a wireless communication solution that includes 2G, 3G, 4G, 5G, or the like and that is applied to the terminal device 200. The mobile communications module 250 may include at least one filter, a switch, a power amplifier, a low noise amplifier (low noise amplifier, LNA), and the like. The mobile communications module 250 may receive an electromagnetic wave through the antenna 1, perform processing such as filtering or amplification on the received electromagnetic wave, and transmit a processed electromagnetic wave to the modem processor for demodulation. The mobile communications module 250 may further amplify a signal modulated by the modem processor, and convert the signal into an electromagnetic wave for radiation through the antenna 1. In some embodiments, at least some functional modules of the mobile communications module 250 may be disposed in the processor 210. In some embodiments, at least some functional modules of the mobile communications module 250 may be disposed in a same device as at least some modules of the processor 210.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by using an audio device (not limited to the speaker 270A, the receiver 270B, or the like), or displays an image or a video by using the display 294. In some embodiments, the modem processor may be an independent device. In some other embodiments, the modem processor may be independent of the processor 210, and is disposed in a same device as the mobile communications module 250 or another functional module.

The wireless communications module 260 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the terminal device 200. The wireless communications module 260 may be one or more devices that integrate at least one communications processing module. The wireless communications module 260 receives an electromagnetic wave through the antenna 2, performs frequency modulation and filtering processing on the electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation through the antenna 2.

In some embodiments, in the terminal device 200, the antenna 1 is coupled to the mobile communications module 250, and the antenna 2 is coupled to the wireless communications module 260, so that the terminal device 200 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based augmentation system (satellite based augmentation systems, SBAS).

The terminal device 200 implements a display function by using the GPU, the display 294, the application processor, and the like. The GPU is a microprocessor for image processing, and is connected to the display 294 and the application processor. The GPU is configured to: perform mathematical and geometric calculation, and render an image. The processor 210 may include one or more GPUs that execute a program instruction to generate or change display information.

The display 294 is configured to display an image, a video, and the like. The display 294 includes a display panel. The display panel may use a liquid crystal display (liquid crystal display, LCD), an organic light-emitting diode (organic light-emitting diode, OLED), an active-matrix organic light-emitting diode or an active-matrix organic light-emitting diode (active-matrix organic light emitting diode, AMOLED), a flexible light-emitting diode (flex light-emitting diode, FLED), a mini-LED, a micro-LED, a micro-OLED, a quantum-dot light-emitting diode (quantum dot light emitting diodes, QLED), or the like. In some embodiments, the terminal device 200 may include one or N displays 294, where N is a positive integer greater than 1.

The terminal device 200 may implement a photographing function by using the ISP, the camera 293, the video codec, the GPU, the display 294, the application processor, and the like.

The ISP is configured to process data fed back by the camera 293. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion on the image. The ISP may further optimize parameters such as exposure and color temperature of a photographing scenario. In some embodiments, the ISP may be disposed in the camera 293.

The camera 293 is configured to capture a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the terminal device 200 may include one or N cameras 293, where N is a positive integer greater than 1. If the terminal device 200 includes N cameras, one of the N cameras is a primary camera.

The digital signal processor is configured to process a digital signal, and may process another digital signal in addition to the digital image signal. For example, when the terminal device 200 selects a frequency, the digital signal processor is configured to perform Fourier transform and the like on frequency energy.

The video codec is configured to: compress or decompress a digital video. The terminal device 200 may support one or more video codecs. Therefore, the terminal device 200 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, with reference to a transfer mode between human brain neurons, and may further continuously perform self-learning. The NPU may implement applications such as intelligent cognition of the terminal device 200, such as image recognition, facial recognition, speech recognition, and text understanding.

The external memory interface 220 may be configured to connect to an external storage card such as a micro SD card, to extend a storage capability of the terminal device 200. The external storage card communicates with the processor 210 through the external memory interface 220, to implement a data storage function. For example, files such as music and a video are stored in the external storage card.

The internal memory 221 may be configured to store computer-executable program code. The executable program code includes instructions. The internal memory 221 may include a program storage area and a data storage area. The program storage area may store an operating system, an application required by at least one function (for example, a sound playing function or an image playing function), and the like. The data storage region may store data (such as audio data and a phone book) and the like that are created during use of the terminal device 200. In addition, the internal memory 221 may include a high-speed random access memory, or may include a nonvolatile memory such as at least one magnetic disk storage device, a flash memory, or a universal flash storage (universal flash storage, UFS). The processor 210 runs the instructions stored in the internal memory 221 and/or the instructions stored in the memory disposed in the processor, to execute various function applications and data processing of the terminal device 200.

The terminal device 200 may implement audio functions such as music playing and recording by using the audio module 270, the speaker 270A, the receiver 270B, the microphone 270C, the headset jack 270D, the application processor, and the like.

The audio module 270 is configured to convert digital audio information into an analog audio signal for output, and is also configured to convert an analog audio input into a digital audio signal. The audio module 270 may be further configured to encode and decode an audio signal. In some embodiments, the audio module 270 may be disposed in the processor 210, or some functional modules of the audio module 270 are disposed in the processor 210.

The speaker 270A, also referred to as a "horn", is configured to convert an audio electrical signal into a sound signal. The terminal device 200 may be used to listen to music or answer a call in a hands-free mode over the speaker 270A.

The receiver 270B, also referred to as an "earpiece", is configured to convert an audio electrical signal into a sound signal. When the terminal device 200 is used to answer a call or receive audio information, the receiver 270B may be put close to a human ear to listen to a voice.

The microphone 270C, also referred to as a "mike" or a "microphone", is configured to convert a sound signal into an electrical signal. When making a call or sending voice information, a user may make a sound close to the microphone 270C through the mouth of the user, to input a sound signal to the microphone 270C. At least one microphone 270C may be disposed in the terminal device 200. In some other embodiments, two microphones 270C may be disposed in the terminal device 200, to collect a sound signal and implement a noise reduction function. In some other embodiments, three, four, or more microphones 270C may alternatively be disposed in the terminal device 200, to collect a sound signal, reduce noise, recognize a sound source, implement a directional recording function, and the like.

The headset jack 270D is configured to be connect to a wired headset. The headset jack 270D may be the USB port 230, or may be a 3.5 mm open mobile terminal platform (open mobile terminal platform, OMTP) standard interface, or a Cellular Telecommunications Industry Association (cellular telecommunications industry association of the USA, CTIA) standard interface.

The depth sensor 280A is configured to obtain depth information of an object. In some embodiments, the depth sensor may be disposed in the camera 293.

The pressure sensor 280B is configured to sense a pressure signal, and may convert the pressure signal into an electrical signal. In some embodiments, the pressure sensor 280B may be disposed on the display 294. There are a plurality of types of pressure sensors 280B such as a resistive pressure sensor, an inductive pressure sensor, and a capacitive pressure sensor. The capacitive pressure sensor may include at least two parallel plates made of conductive materials. When a force is applied to the pressure sensor 280B, capacitance between electrodes changes. The terminal device 200 determines strength of the force based on a change of the capacitance. When a touch operation is performed on the display 294, the terminal device 200 detects strength of the touch operation by using the pressure sensor 280B. The terminal device 200 may further calculate a touch location based on a detection signal of the pressure sensor 280B. In some embodiments, touch operations that are performed at a same touch location but have different touch operation strength may correspond to different operation instructions. For example, when a touch operation with touch operation strength less than a first pressure threshold is performed on a Messages application icon, an instruction for viewing an SMS message is executed. When a touch operation with touch operation strength greater than or equal to the first pressure threshold is performed on the Messages application icon, an instruction for creating a new SMS message is executed.

The gyroscope sensor 280C may be configured to determine a motion posture of the terminal device 200. In some embodiments, angular velocities of the terminal device 200 around three axes (namely, axes x, y, and z) may be determined by using the gyroscope sensor 280C. The gyroscope sensor 280C may be configured to perform image stabilization during photographing. For example, when the shutter is pressed, the gyroscope sensor 280C detects an angle at which the terminal device 200 shakes, calculates, based on the angle, a distance for which a lens module needs to compensate, and enables the lens to cancel the shake of the terminal device 200 through reverse motion, to implement image stabilization. The gyroscope sensor 280C may also be used in navigation and somatic game scenarios.

The barometric pressure sensor 280D is configured to measure barometric pressure. In some embodiments, the terminal device 200 calculates an altitude based on a barometric pressure value measured by the barometric pressure sensor 280D, to assist in positioning and navigation.

The magnetic sensor 280E includes a Hall sensor. The terminal device 200 may detect opening and closing of a flip leather case by using the magnetic sensor 280E. In some embodiments, when the terminal device 200 is a clamshell phone, the terminal device 200 may detect opening and closing of a flip cover by using the magnetic sensor 280E. Further, a feature such as automatic unlocking upon opening of the flip cover is set based on a detected opening or closing state of the leather case or a detected opening or closing state of the flip cover.

The acceleration sensor 280F may detect magnitudes of accelerations in various directions (usually on three axes) of the terminal device 200, and may detect a magnitude and a direction of gravity when the terminal device 200 is still. The acceleration sensor 280F may be further configured to recognize a posture of the terminal device, and is applied to an application such as switching between a landscape mode and a portrait mode or a pedometer.

The distance sensor 280G is configured to measure a distance. The terminal device 200 may measure the distance in an infrared or a laser manner. In some embodiments, in a photographing scenario, the terminal device 200 may measure a distance by using the distance sensor 280G, to implement quick focusing.

The optical proximity sensor 280H may include a light-emitting diode (LED) and an optical detector, for example, a photodiode. The light-emitting diode may be an infrared light-emitting diode. The terminal device 200 emits infrared light by using the light-emitting diode. The terminal device 200 detects infrared reflected light from a nearby object by using the photodiode. When sufficient reflected light is detected, the terminal device 200 may determine that there is an object near the terminal device 200. When insufficient reflected light is detected, the terminal device 200 may determine that there is no object near the terminal device 200. The terminal device 200 may detect, by using the optical proximity sensor 280H, that the user holds the terminal device 200 close to an ear to make a call, to automatically perform screen-off for power saving. The optical proximity sensor 280H may also be used in a leather case mode or a pocket mode to automatically unlock or lock the screen.

The fingerprint sensor 280J is configured to collect a fingerprint. The terminal device 200 may use a feature of the collected fingerprint to implement fingerprint-based unlocking, application lock access, fingerprint-based photographing, fingerprint-based call answering, and the like.

The temperature sensor 280K is configured to detect a temperature. In some embodiments, the terminal device 200 executes a temperature processing policy based on the temperature detected by the temperature sensor 280K. For example, when the temperature reported by the temperature sensor 280K exceeds a threshold, the terminal device 200 lowers performance of a processor near the temperature sensor 280K, to reduce power consumption to implement thermal protection. In some other embodiments, when the temperature is less than another threshold, the terminal device 200 heats the battery 242 to prevent the terminal device 200 from being abnormally powered off because of the low temperature. In some other embodiments, when the temperature is less than still another threshold, the terminal device 200 boosts an output voltage of the battery 242, to prevent abnormal power-off caused by the low temperature.

The touch sensor 280L is also referred to as a "touch control device". The touch sensor 280L may be disposed on the display 294. The touch sensor 280L and the display 294 constitute a touchscreen, which is also referred to as a "touch screen". The touch sensor 280L is configured to detect a touch operation performed on or near the touch sensor 280L. The touch sensor may transfer the detected touch operation to the application processor, to determine a type of a touch event. The display 294 may provide a visual output related to the touch operation. In some other embodiments, the touch sensor 280L may alternatively be disposed on a surface of the terminal device 200 at a location different from a location of the display 294.

The ambient light sensor 280M is configured to sense ambient light brightness. The terminal device 200 may adaptively adjust brightness of the display 294 based on the sensed ambient light brightness. The ambient light sensor 280M may also be configured to automatically adjust a white balance during photographing. The ambient light sensor 280M may also cooperate with the optical proximity sensor 280G to detect whether the terminal device 200 is in a pocket, to avoid an accidental touch.

The bone conduction sensor 280N may obtain a vibration signal. In some embodiments, the bone conduction sensor 280N may obtain a vibration signal of a vibration bone of a human vocal-cord part. The bone conduction sensor 280N may also be in contact with a human pulse, to receive a blood pressure beating signal. In some embodiments, the bone conduction sensor 280N may alternatively be disposed in a headset to form a bone conduction headset. The audio module 270 may obtain a voice signal through parsing based on the vibration signal that is of the vibration bone of the vocal-cord part and that is obtained by the bone conduction sensor 280N, to implement a voice function. The application processor may parse heart rate information based on the blood pressure beating signal obtained by the bone conduction sensor 280N, to implement a heart rate detection function.

The buttons 290 include a power button, a volume button, and the like. The button 290 may be a mechanical key, or may be a touch button. The terminal device 200 may receive a button input, and generate a button signal input related to a user setting and function control of the terminal device 200.

The motor 291 may generate a vibration prompt. The motor 291 may be configured to provide an incoming call vibration prompt, or may be configured to provide a touch vibration feedback. For example, touch operations performed on different applications (for example, photographing and audio playing) may correspond to different vibration feedback effects. The motor 291 may also provide different vibration feedback effects that correspond to touch operations performed on different areas of the display 294. Different application scenarios (for example, time reminding, information receiving, an alarm clock, and a game) may also correspond to different vibration feedback effects. A touch vibration feedback effect may be further customized.

The indicator 292 may be an indicator light, and may be configured to indicate a charging status and a power change, or may be configured to indicate a message, a missed call, a notification, and the like.

The SIM card interface 295 is configured to connect to a SIM card. The SIM card may be inserted into the SIM card interface 295 or detached from the SIM card interface 295, to implement contact with or separation from the terminal device 200. The terminal device 200 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type, or may be of different types. The SIM card interface 295 may also be compatible with different types of SIM cards. The SIM card interface 295 may also be compatible with the external storage card. The terminal device 200 interacts with a network by using the SIM card, to implement functions such as a call function, a data communication function, and the like. In some embodiments, the terminal device 200 uses an eSIM, that is, an embedded SIM card. The eSIM card may be embedded in the terminal device 200, and cannot be separated from the terminal device 200.

The following specifically describes an information processing method provided in the embodiments of this application with reference to FIG. 1 and FIG. 2.

It should be noted that, in the following embodiments of this application, names of messages between network elements, names of parameters in messages, or the like are merely examples, and there may be other names during specific implementation. This is not specifically limited in the embodiments of this application.

It may be understood that, in the embodiments of this application, a terminal device may perform some or all of steps in the embodiments of this application. These steps are merely examples. In the embodiments of this application, the terminal device may also perform other steps or variations of the steps. In addition, the steps may be performed in a sequence different from a sequence presented in the embodiments of this application, and it is possible that not all the steps in the embodiments of this application need to be performed.

Figure 3A:
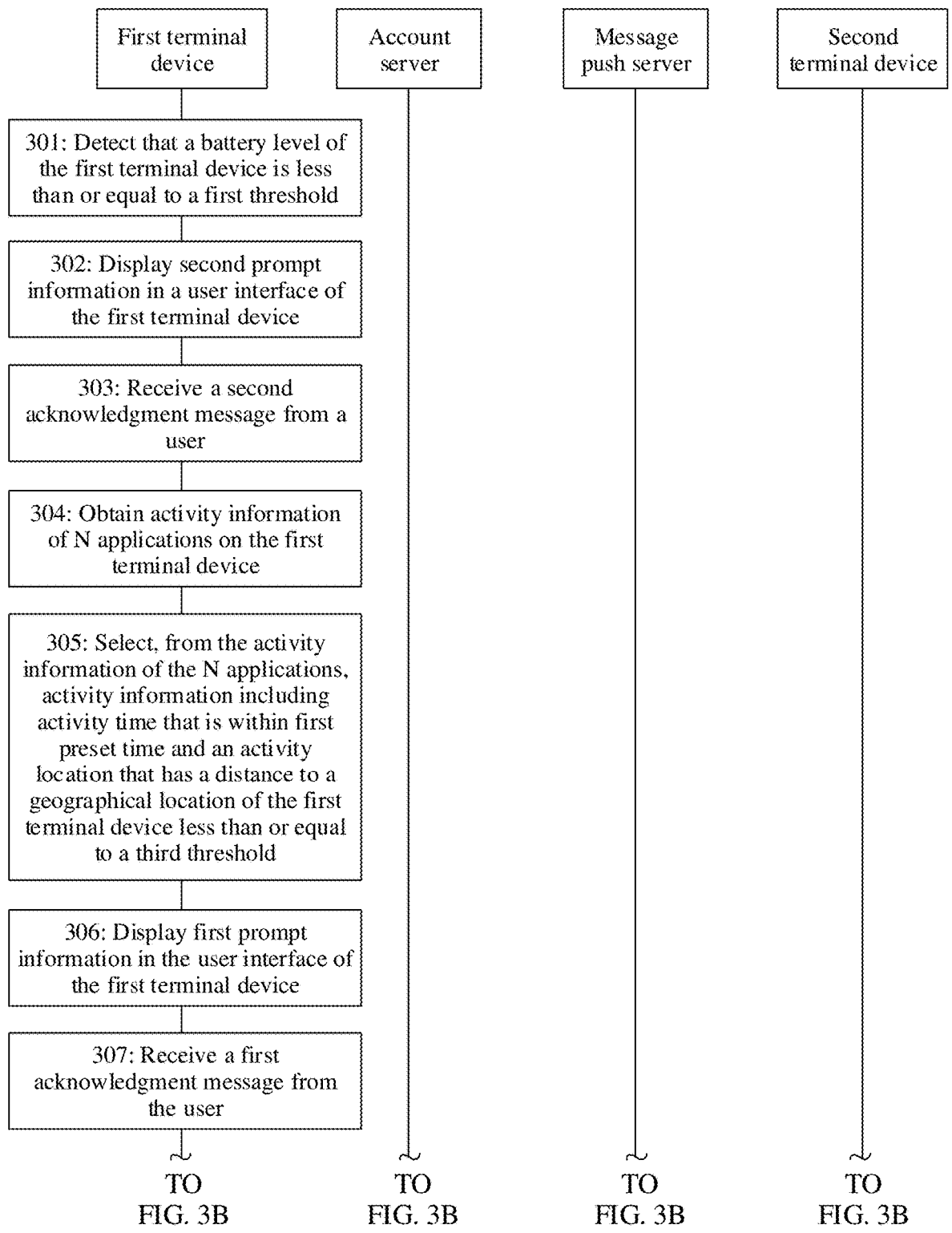
FIG. 3A and FIG. 3B are a schematic flowchart 1 of an information processing method according to an embodiment of this application.
Figure 3B:
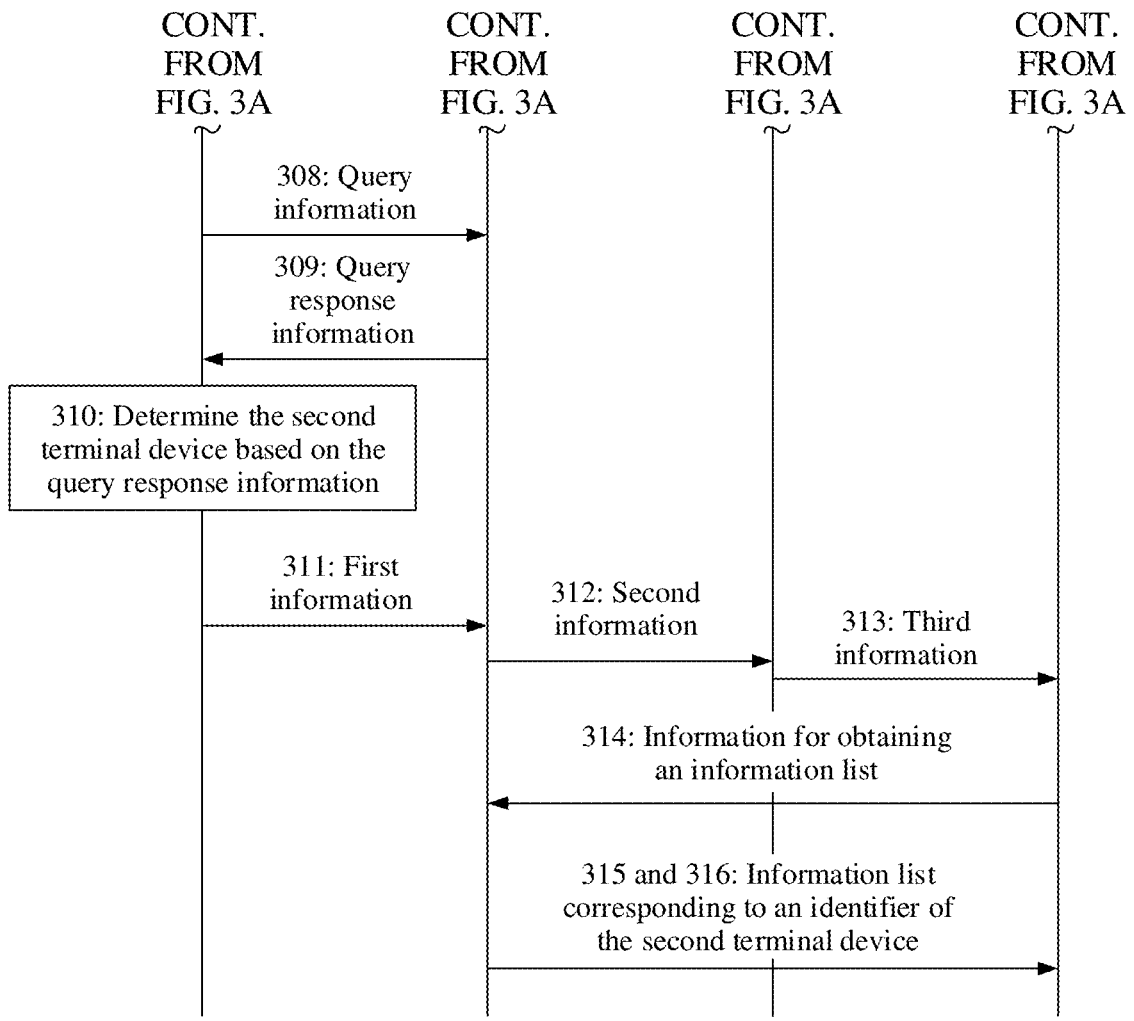

FIG. 3A and FIG. 3B show an information processing method according to an embodiment of this application. The information processing method includes step 301 to step 316.

Step 301: A first terminal device detects that a battery level of the first terminal device is less than or equal to a first threshold.

The first terminal device may be the terminal device 103, the terminal device 104, or the terminal device 105 in the information processing system shown in FIG. 1.

Optionally, an intelligent application is installed on the first terminal device. The intelligent application is an application that performs the information processing method provided in this embodiment of this application. For example, the intelligent application performs all or some of step 301 to step 316.

It should be noted that, when a user starts the intelligent application for the first time, the intelligent application may prompt the user about data (for example, a user account, permission for reading an application on the first terminal device, a geographical location of the first terminal device, and activity information of the application on the first terminal device) read by the intelligent application and a purpose of reading the data (for example, reading the user account is to query for an available device that uses the user account).

The available device may be an online device that uses the same user account as the first terminal device, and a battery level of the available device is greater than or equal to a second threshold.

Optionally, the first terminal device has a battery level detection capability.

For example, an application for detecting a battery level of a device may be installed on the first terminal device, and the application may periodically invoke a battery level detection interface of a system on the first terminal device. If the application detects that the battery level of the first terminal device is less than or equal to the first threshold, the application notifies the intelligent application. If the application detects that the battery level of the first terminal device is greater than the first threshold, the application does not notify the intelligent application, but continues periodically invoking the battery level detection interface of the system on the first terminal device.

For another example, the intelligent application may periodically invoke the battery level detection interface of the system on the first terminal device, to detect whether the battery level of the first terminal device is less than or equal to the first threshold. If the intelligent application detects that the battery level of the first terminal device is less than or equal to the first threshold, the intelligent application performs all or some of step 302 to step 316. If the intelligent application detects that the battery level of the first terminal device is greater than the first threshold, the intelligent application does not perform the following steps, but continues periodically invoking the battery level detection interface of the system on the first terminal device.

Step 302: Display second prompt information in a user interface of the first terminal device.

The second prompt information may be used to prompt the user to push an information list to another terminal device.

If the first terminal device is the terminal device 103 shown in FIG. 1, the another terminal device may be the terminal device 104 or the terminal device 105 shown in the figure. If the first terminal device is the terminal device 104 shown in FIG. 1, the another terminal device may be the terminal device 103 or the terminal device 105 shown in the figure. If the first terminal device is the terminal device 105 shown in FIG. 1, the another terminal device may be the terminal device 103 or the terminal device 104 shown in the figure.

The information list may include the activity information of the application on the first terminal device, for example, activity information of a conference application (for example, to hold a video conference at a place A at 2:00 p.m.), activity information in Note (for example, to buy a train ticket at 4:00 p.m.), and activity information of an alarm application (for example, to ring at 1:30 p.m.), activity information of a smart home application (for example, to turn on an air conditioner at 6:00 p.m.), activity information of an ebook application (for example, an ebook being read), and activity information of another application (for example, an electronic voucher in a ticket-buying application).

It should be noted that the available device may be a device on which the application (for example, Smart Home or Meituan) on the first terminal device is not installed; the available device may be a device on which some applications on the first terminal device are installed; or the available device may be a device on which all applications on the first terminal device are installed.

Figure 4A:
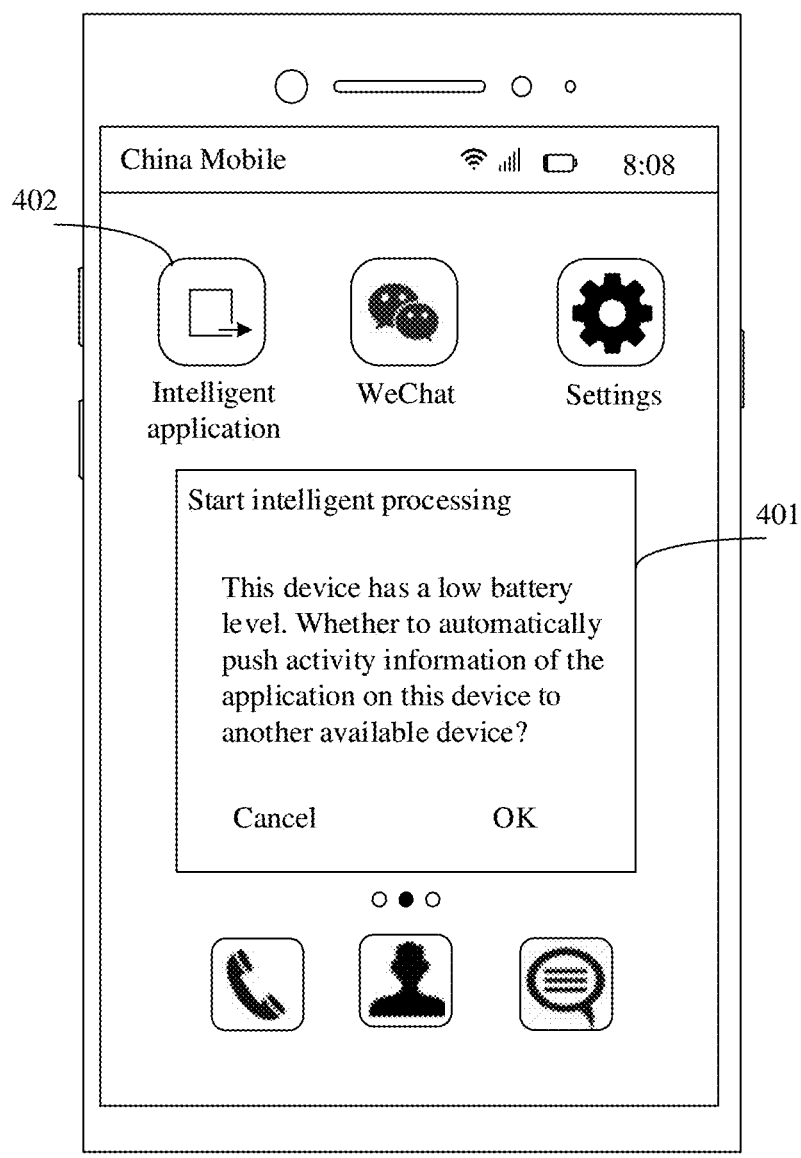
FIG. 4A is a schematic diagram 1 of a user interface of a first terminal device according to an embodiment of this application.

FIG. 4A is a schematic diagram of a user interface of a first terminal device. When the first terminal device detects that the battery level of the first terminal device is less than or equal to 5%, the first terminal device may display, in the user interface of the first terminal device, the second prompt information shown in FIG. 4A. A prompt dialog box 401 in FIG. 4A is used to prompt the user: This device has a low battery level. Whether to automatically push activity information of the application on this device to another available device.

Step 303: The first terminal device receives a second acknowledgment message from the user.

The second acknowledgment message may be used to indicate the first terminal device to obtain the information list.

It should be noted that the second acknowledgment message is used to indicate the first terminal device to obtain the information list. This may be described as: The second acknowledgment message is used to indicate the first terminal device to perform step 304 and all or some of steps after step 304.

Figure 4B:
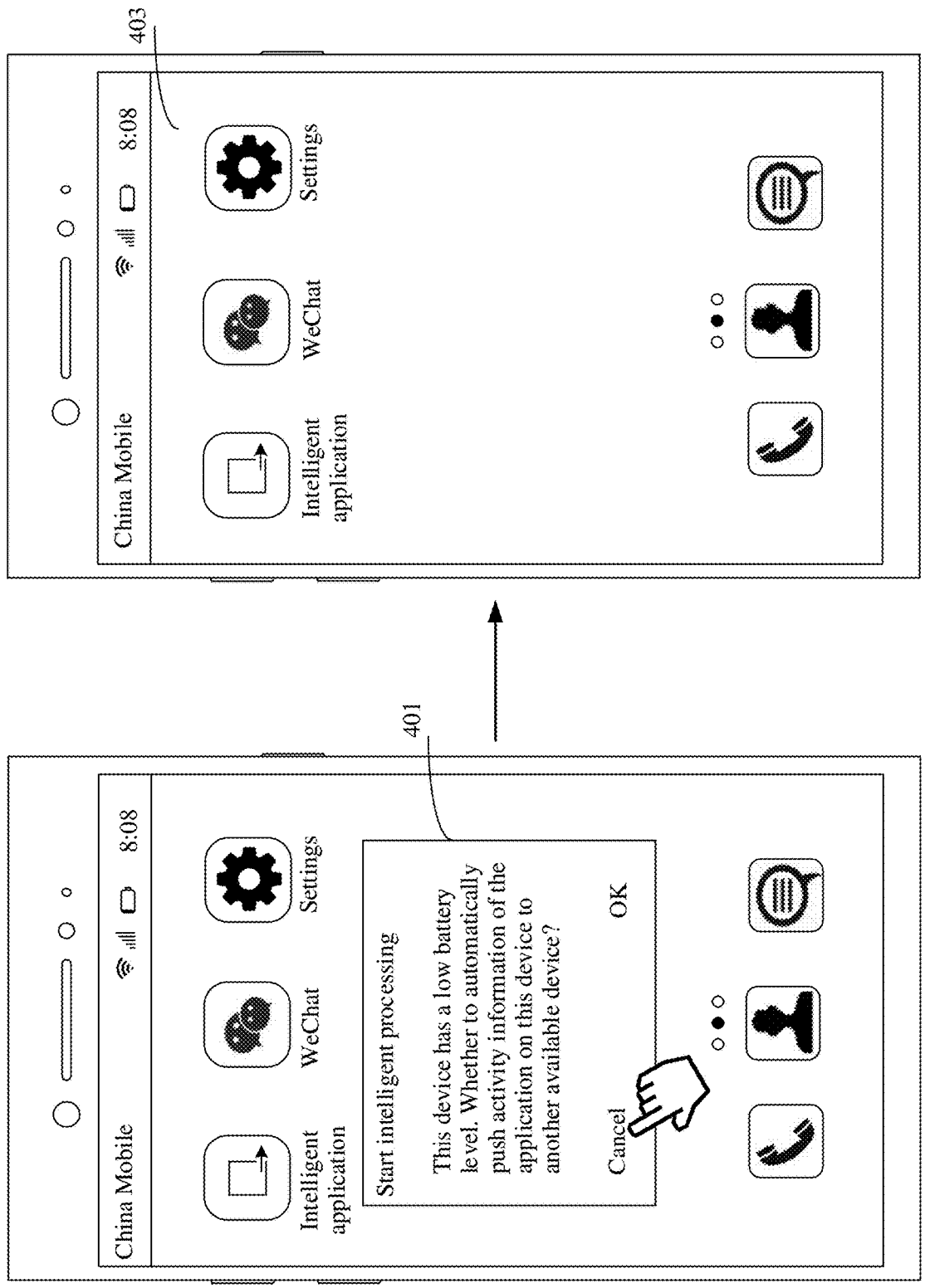
FIG. 4B is a schematic diagram 2 of a user interface of a first terminal device according to an embodiment of this application.

For example, in FIG. 4B, if the user taps (for example, taps one time) a cancel button, the first terminal device may return to a user interface 403, and does not obtain the information list.

Figure 4C:
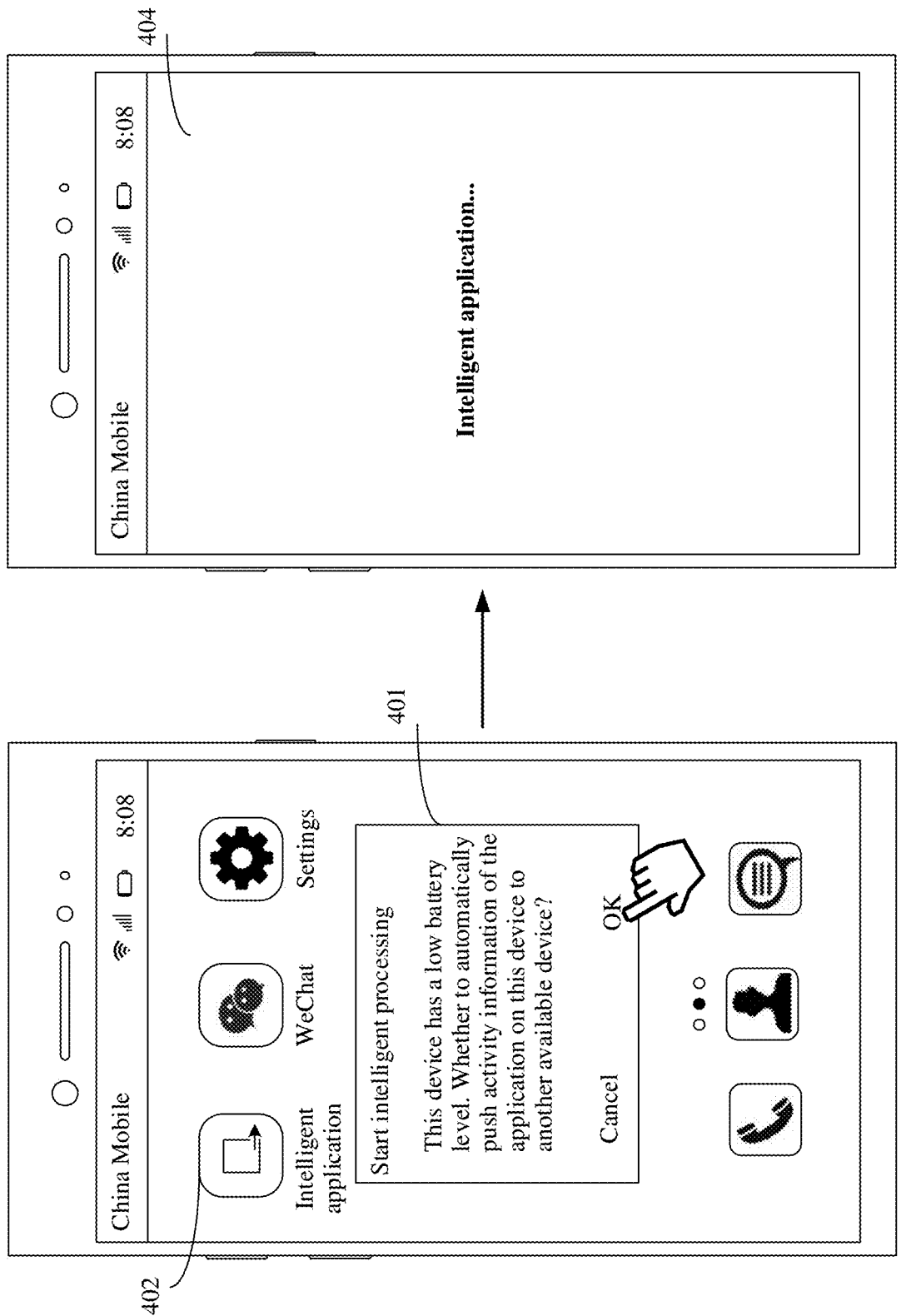
FIG. 4C is a schematic diagram 3 of a user interface of a first terminal device according to an embodiment of this application.

For example, if the user taps an OK button (in other words, the first terminal device receives the second acknowledgment message from the user), the first terminal device may automatically start an intelligent application 402. For example, in FIG. 4C, if the user taps an OK button, the first terminal device may display a startup interface 404 of the intelligent application. After the first terminal device starts the intelligent application 402, the first terminal device performs all or some of step 304 to step 316.

For example, if the user performs no operation within second preset time (to be specific, the user neither taps the cancel button in FIG. 4A, nor taps the OK button in FIG. 4A), the first terminal device determines by default that the user taps the OK button. For example, if the user performs no operation within the second preset time (for example, 10 seconds (s)), the first terminal device may automatically start the intelligent application 402; and after the first terminal device starts the intelligent application 402, the first terminal device performs all or some of step 304 to step 316.

Step 304: The first terminal device obtains activity information of N applications on the first terminal device.

The N applications may be all applications on the first terminal device; the N applications may be N frequently-used applications; or the N applications may be N user-defined applications.

For example, the first terminal device may obtain activity information of all the applications on the first terminal device.

For example, the first terminal device may obtain activity information of 10 frequently-used applications on the first terminal device.

For example, the user may customize eight applications in the intelligent application, and the first terminal device may subsequently obtain activity information of the eight applications.

The activity information of the N applications includes activity locations, activity time, and activity content, and N is a positive integer.

For example, the user defines six applications (a conference application, Note, Alarms, Smart Home, Ebook, and Meituan). Table 1 shows activity information of the six applications. For the conference application, activity content is to hold a video conference, activity time is 2:00 p.m., and an activity location is A. For Note, activity content is to buy a train ticket, activity time is 7:00 p.m., and an activity location is empty (that is, there are no special requirement on the activity location). For Alarms, activity content is that a lunch break is over, and activity time is 1:30 p.m. and an activity location is empty. For Smart Home, activity content is to turn on an air conditioner, activity time is 8 p.m., and an activity location is empty. For Ebook, activity content is Dream of Red Mansions.txt, activity time is now, and an activity location is empty (that is, the user is reading the ebook Dream of Red Mansions). For Meituan, activity content is a ticket code and/or a QR code for a movie, activity time is 4:00 p.m., and an activity location is B.

TABLE 1

| Application | Activity content | Activity time | Activity location |
|---|---|---|---|
| Conference application | Hold a video conference | 2:00 p.m. | A |
| Note | Buy a train ticket | 7:00 p.m. | — |
| Alarms | A lunch break is over | 1:30 p.m. | — |
| Smart Home | Turn on an air conditioner | 8:00 p.m. | — |
| Ebook | Dream of Red Mansions.txt | Now | — |
| Meituan | Ticket code and/or QR code for a movie | 4:00 p.m. | B |

Step 305: The first terminal device selects, from the activity information of the N applications, activity information including activity time that is within first preset time and an activity location that has a distance to the geographical location of the first terminal device less than or equal to a third threshold.

The following describes step 305 by using the activity information of the six applications shown in Table 1 as an example.

It is assumed that current time is 1:00 p.m., the first preset time is three hours, the distance between the activity location A and the geographical location of the first terminal device is greater than the third threshold (for example, 20 kilometers), and the distance between the activity location B and the geographical location of the first terminal device is less than the third threshold. For the conference application, because the distance between the activity location A and the geographical location of the first terminal device is greater than the third threshold, the first terminal device does not select activity information of the conference application. For Note, because the activity time is not within the first preset time, the first terminal device does not select activity information of Note. For Alarms, because the activity time is within the first preset time, and there is no requirement on the activity location, the first terminal device selects activity information of Alarms. For Smart Home, because the activity time is not within the first preset time, the first terminal device does not select activity information of Smart Home. For Ebook, because the activity time is within the first preset time, and there is no requirement on the activity location, the first terminal device selects activity information of Ebook. For Meituan, because the activity time is within the first preset time, and the distance between the activity location B and the geographical location of the first terminal device is less than the third threshold, the first terminal device selects activity information of Meituan.

After step 305, the activity information of the applications selected by the first terminal device is shown in Table 2.

TABLE 2

| Application | Activity content | Activity time | Activity location |
|---|---|---|---|
| Alarms | A lunch break is over | 1:30 p.m. | — |
| Ebook | Dream of Red Mansions.txt | Now | — |
| Meituan | Ticket code and/or QR code for a movie | 4:00 p.m. | B |

Step 306: Display first prompt information in the user interface of the first terminal device.

The first prompt information may be used to prompt the user about the activity information selected by the first terminal device.

The activity information selected by the first terminal device may be displayed in the user interface of the first terminal device in a plurality of forms, for example, in a form of a picture or a form of a notification message. This is not limited. This application provides descriptions merely by using an example in which the activity information selected by the first terminal device is displayed in the user interface of the first terminal device in the form of a notification message.

It should be noted that if the first terminal device selects a plurality of pieces of activity information, and cannot display all the activity information selected by the first terminal device in the user interface of the first terminal device, a drop-down list may be added to the first terminal device, and the user may drag the drop-down list to view all the activity information selected by the first terminal device.

If the activity information selected by the first terminal device is shown in Table 2, the first terminal device may display the activity information shown in Table 2 in the user interface of the first terminal device, so that the user determines which activity information is to be pushed to the another terminal device.

Figure 5:
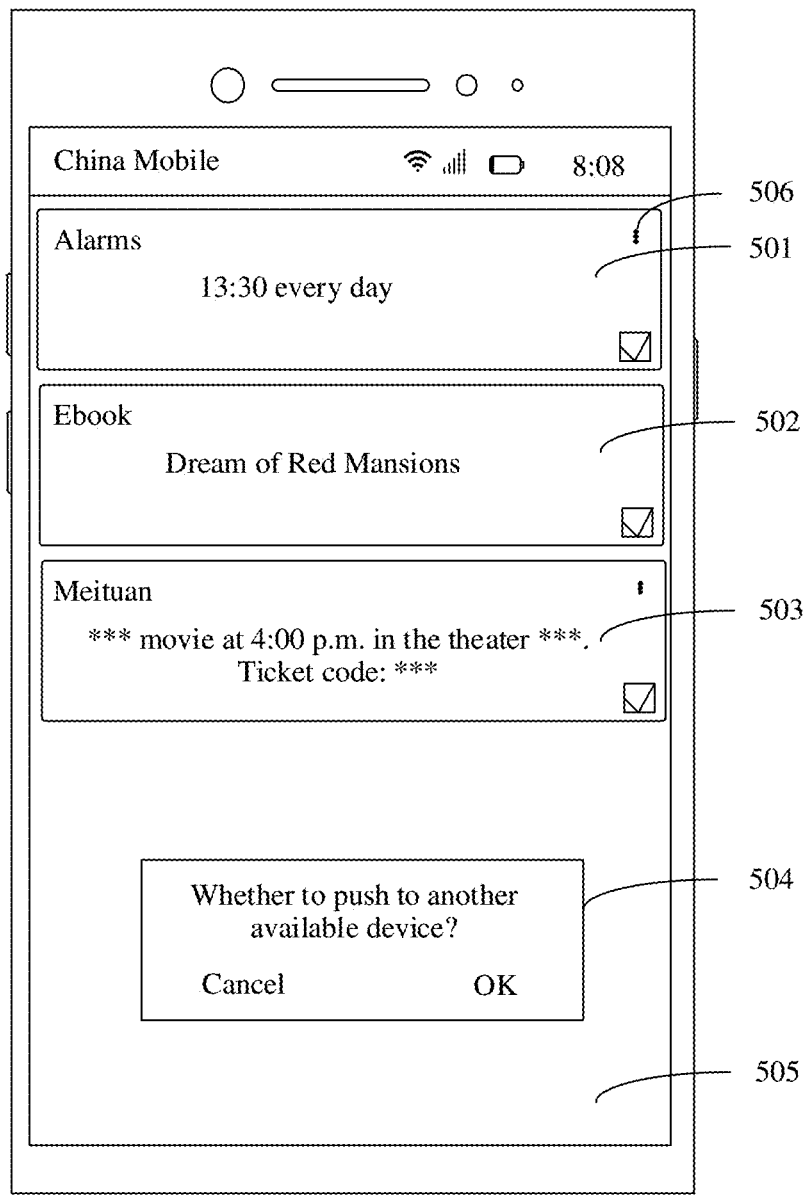
FIG. 5 is a schematic diagram 4 of a user interface of a first terminal device according to an embodiment of this application.

FIG. 5 is a schematic diagram of a user interface of a first terminal device. In FIG. 5, prompt dialog boxes for the three pieces of activity information: a prompt dialog box 501 for the activity information of Alarms, a prompt dialog box 502 for the activity information of Ebook, and a prompt dialog box 503 for the activity information of Meituan, are displayed in the user interface 504 of the first terminal device. There is a check box in the lower right corner of each of the prompt dialog box 501 to the prompt dialog box 503, and the check box may be used for the user to select whether to push activity information in a prompt dialog box in which the check box is located to the another terminal device. For example, if the user selects the prompt dialog box 501 and the prompt dialog box 502, the user determines to push the activity information in the prompt dialog box 501 and the prompt dialog box 502 to the another terminal device. The user may tap a prompt dialog box or tap an icon for viewing details in the upper right corner of the prompt dialog box, to view detailed activity information in the prompt dialog box. For example, the user may tap the prompt dialog box 502, to open the ebook Dream of Red Mansions, and may tap an icon 506 in the upper right corner of the prompt dialog box 501, to view the detailed activity information of Alarms, and to modify a ringing moment and frequency of the alarm.

A prompt dialog box 504 is further displayed in the user interface 504 of the first terminal device in FIG. 5. The prompt dialog box 504 is used for the user to determine whether to push activity information in a prompt dialog box in which a check box is selected in the user interface 504 to the another terminal device.

It should be noted that FIG. 5 merely shows an example of the first prompt information, and the first prompt information may alternatively be displayed in the user interface of the first terminal device in another form. This is not limited.

Step 307: The first terminal device receives first acknowledgment information from the user.

The first acknowledgment information may include the information list.

For example, if the user selects the prompt dialog box 501 and the prompt dialog box 503 shown in FIG. 5, and taps an OK button in the prompt dialog box 504 (in other words, the first terminal device receives the first acknowledgment information from the user), the information list received by the first terminal device includes the activity information of Alarms and the activity information of Meituan. Subsequently, the first terminal device may push the information list to the another terminal device.

For example, if the user taps a cancel button in the prompt dialog box 504, the first terminal device may not push the information list to the another terminal device.

For example, if the user performs no operation within third preset time, the first terminal device pushes by default all the activity information selected by the first terminal device to the another terminal device. For example, in the user interface 505 shown in FIG. 5, if the user performs no operation within the third preset time (for example, 8 s), the first terminal device determines by default that the user selects the prompt dialog box 501 to the prompt dialog box 503 and taps the OK button.

Step 308: The first terminal device sends query information to an account server.

The query information may be used to query for an available device.

Optionally, the query information includes the user account used by the first terminal device. After receiving the query information, the account server queries for, based on the user account included in the query information and used by the first terminal device, an available device that uses the user account.

Optionally, the query information includes an identifier of the first terminal device. After receiving the query information, the account server queries for, based on the identifier of the first terminal device included in the query information, the user account used by the first terminal device, and then queries for, based on the user account used by the first terminal device, an available device that uses the user account.

Optionally, the query information includes the user account used by the first terminal device and an identifier of the first terminal device. After receiving the query information, the account server queries for, based on the user account used by the first terminal device or the identifier of the first terminal device, an available device that uses under the user account used by the first terminal device.

Step 309: The account server receives the query information sent by the first terminal device, and sends query response information to the first terminal device.

The query response information may include a device list, and the device list may include information about the available device.

It should be noted that the device list may be in a plurality of forms, for example, a table or an array. This is not limited. This application provides descriptions merely by using an example in which the device list is in the form of a table.

In a case, the information about the available device includes an identifier of the available device and a battery level of the available device.

For example, the first terminal device is the terminal device 103 in FIG. 1, and the available devices are the terminal device 104 and the terminal device 105 in FIG. 1. The device list may be shown in Table 3. In Table 3, for the terminal device 104, an identifier is 1, and a battery level is 80%; and for the terminal device 105, an identifier is 2, and a battery level is 75%.

TABLE 3

| Available device | Identifier of the available device | Battery level of the available device |
|---|---|---|
| Terminal device 104 | 1 | 80% |
| Terminal device 105 | 2 | 75 |

It should be noted that Table 3 merely shows an example of the device list. In actual application, the device list may include any row of information in Table 3, or the device list may include information about more available devices than the available devices shown in Table 3. This is not limited.

In another case, the information about the available device includes an identifier of the available device, a battery level of the available device, and a geographical location of the available device.

For example, the first terminal device is the terminal device 103 in FIG. 1, and the available devices are the terminal device 104 and the terminal device 105 in FIG. 1. The device list may be shown in Table 4. In Table 4, for the terminal device 104, an identifier is 1, a battery level is 80%, and a geographical location is C; and for the terminal device 105, an identifier is 2, a battery level is 75%, and a geographical location is D.

TABLE 4

| Available device | Identifier of the available device | Battery level of the available device | Geographical location of the available device |
|---|---|---|---|
| Terminal device 104 | 1 | 80% | C |
| Terminal device 105 | 2 | 75 | D |

It should be noted that Table 4 merely shows an example of the device list. In actual application, the device list may include any row of information in Table 4, or the device list may include information about more available devices than the available devices shown in Table 4. This is not limited.

In still another case, the information about the available device includes an identifier of the available device, a battery level of the available device, a geographical location of the available device, and a model of the available device.

For example, the first terminal device is the terminal device 103 in FIG. 1, and the available devices are the terminal device 104 and the terminal device 105 in FIG. 1. The device list may be shown in Table 5. In Table 5, for the terminal device 104, an identifier is 1, a battery level is 80%, a geographical location is C, and a model is a smartwatch GT; and for the terminal device 105, an identifier is 2, a battery level is 75%, a geographical location is D, and a model is a mobile phone P20pro.

TABLE 5

| Available device | Identifier of the available device | Battery level of the available device | Geographical location of the available device | Model of the available device |
|---|---|---|---|---|
| Terminal device 104 | 1 | 80% | C | GT |
| Terminal device 105 | 2 | 75 | D | P20pro |

It should be noted that Table 5 merely shows an example of the device list. In actual application, the device list may include any row of information in Table 5, or the device list may include information about more available devices than the available devices shown in Table 5. This is not limited.

Step 310: The first terminal device receives the query response information sent by the account server, and determines a second terminal device based on the query response information.

The second terminal device may be a terminal device selected from the available device.

In a case, if the device list includes information about one available device, and a battery level of the available device is greater than or equal to the second threshold, that the first terminal device determines a second terminal device based on the query response information may include: The first terminal device determines that the available device is the second terminal device.

For example, the device list includes information about one available device, and the second threshold is 50%. If a battery level of the available device is 80%, the first terminal device determines that the available device is the second terminal device.

In another case, if the device list includes information about two or more available devices, that the first terminal device determines a second terminal device based on the query response information may include: The first terminal device determines the second terminal device based on geographical locations of the two or more available devices and/or battery levels of the two or more available devices.

The information about the available devices shown in Table 4 is used as an example for description below.

In Example 1, the first terminal device determines, from the two or more available devices, that an available device whose geographical location is nearer/nearest to the first terminal device is the second terminal device. For example, if a distance between the geographical location of the first terminal device and the geographical location C of the terminal device 104 is less than a distance between the geographical location of the first terminal device and the geographical location D of the terminal device 105, the first terminal device determines that the terminal device 104 is the second terminal device.

In Example 2, the first terminal device determines, from the two or more available devices, that an available device with a higher/highest battery level is the second terminal device.

For example, if the battery level (80%) of the terminal device 104 is higher than the battery level (75%) of the terminal device 105, the first terminal device determines that the terminal device 104 is the second terminal device.

In Example 3, the first terminal device determines, from the two or more available devices, that an available device whose geographical location is nearer/nearest to the first terminal device and whose battery level is higher/highest is the second terminal device. For example, if a distance between the geographical location of the first terminal device and the geographical location C of the terminal device 104 is less than a distance between the geographical location of the first terminal device and the geographical location D of the terminal device 105, and the battery level (80%) of the terminal device 104 is higher than the battery level (75%) of the terminal device 105, the first terminal device determines that the terminal device 104 is the second terminal device.

In still another case, if the device list includes information about two or more available devices, that the first terminal device determines a second terminal device based on the query response information may include: The first terminal device determines priorities of the available devices based on geographical locations of the two or more available devices and/or battery levels of the two or more available devices, and displays third prompt information in the user interface of the first terminal device. The first terminal device receives a third acknowledgment message from the user, and determines the second terminal device based on the third acknowledgment message.

The third prompt information may be used to prompt the user to select the second terminal device. The third acknowledgment message is used to indicate the second terminal device.

The information about the available devices shown in Table 5 is used as an example for description below.

In Example 4, the first terminal device determines, from the two or more available devices, that a priority of an available device whose geographical location is nearer/nearest to the first terminal device is higher than a priority of an available device whose geographical location is further/furthest from the first terminal device. For example, if a distance between the geographical location of the first terminal device and the geographical location C of the terminal device 104 is less than a distance between the geographical location of the first terminal device and the geographical location D of the terminal device 105, the first terminal device determines that a priority of the terminal device 104 is higher than a priority of the terminal device 105.

In Example 5, the first terminal device determines, from the two or more available devices, that a priority of an available device with a higher/highest battery level is higher than a priority of an available device with a lower/lowest battery level. For example, if the battery level (80%) of the terminal device 104 is higher than the battery level (75%) of the terminal device 105, the first terminal device determines that a priority of the terminal device 104 is higher than a priority of the terminal device 105.

In Example 6, the first terminal device determines, from the two or more available devices, that a priority of an available device whose geographical location is nearer/nearest to the first terminal device and whose battery level is higher/highest is higher than a priority of an available device whose geographical location is further/furthest from the first terminal device and whose battery level is lower/lowest. For example, if a distance between the geographical location of the first terminal device and the geographical location C of the terminal device 104 is less than a distance between the geographical location of the first terminal device and the geographical location D of the terminal device 105, and the battery level (80%) of the terminal device 104 is higher than the battery level (75%) of the terminal device 105, the first terminal device determines that a priority of the terminal device 104 is higher than a priority of the terminal device 105.

Figure 6:
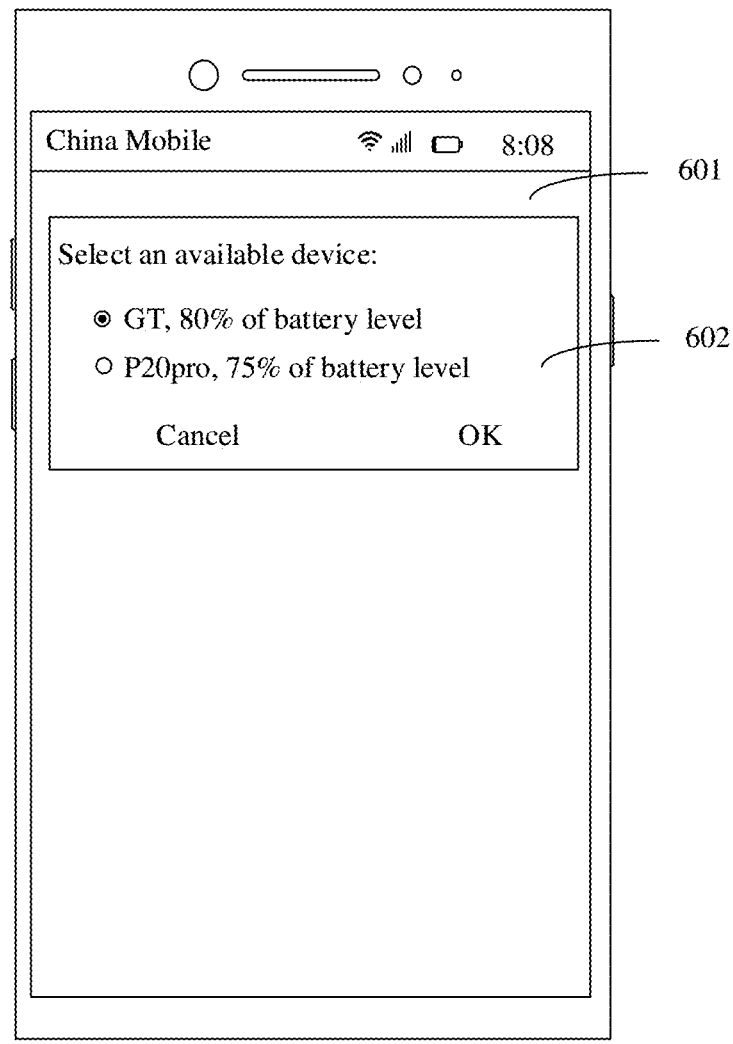
FIG. 6 is a schematic diagram 5 of a user interface of a first terminal device according to an embodiment of this application.

FIG. 6 is a schematic diagram of a user interface of a first terminal device. In FIG. 6, a prompt dialog box 602 is displayed in the user interface 601. The prompt dialog box 602 is used to prompt the user to select the second terminal device. Available devices (GT and P20pro) displayed in the prompt dialog box 602 are user equipments sorted in descending order based on priorities of the available devices determined in the foregoing Example 4 to Example 6 (that is, a priority of GT is higher than a priority of P20pro), and the first terminal device selects an available device with a higher/highest priority as the second terminal device by default. The user may select a proper available device as required and tap an OK button.

For example, if the terminal device 104 is located besides the user, the user may directly tap the OK button. In this case, the first terminal device uses the terminal device 104 as the second terminal device.

For example, if the terminal device 105 is located besides the user, the user may select P20pro, and then tap the OK button. In this case, the first terminal device uses the terminal device 105 as the second terminal device.

For example, the user equipment may tap a cancel button to cancel pushing of the information list or to indicate the account server to query for an available device again.

For example, if the user performs no operation within fourth preset time, the first terminal device determines by default that an available device with a higher/highest priority is the second terminal device. For example, if the user performs no operation within the fourth preset time (for example, 9 s), the first terminal device uses the terminal device 104 as the second terminal device.

Optionally, if the account server does not find an available device, the query response information does not include information about an available device. In this case, after receiving the query response information, the first terminal device prompts the user with "There is no available device. Please check whether another device has logged in or has a low battery level".

Step 311: The first terminal device sends first information to the account server.

The first information may include the information list and an identifier of the second terminal device, and the first information may be used to indicate the account server to send second information to a message push server.

Step 312: The account server receives the first information sent by the first terminal device, and sends the second information to the message push server.

The second information may include the identifier of the second terminal device, and the second information may be used to indicate the message push server to send third information to the second terminal device.

Optionally, after receiving the first information, the account server sends response information of the first information to the first terminal device, where the response information of the first information is used to indicate that the account server successfully receives the first information.

Optionally, if the first terminal device does not receive the response information of the first information within fifth preset time, the first terminal device re-sends the first information to the account server.

For example, after sending the first information to the account server, the first terminal device does not receive the response information of the first information within the fifth preset time (for example, 20 s). In this case, the first terminal device re-sends the first information to the account server.

Step 313: The message push server receives the second information sent by the account server, and sends the third information to the second terminal device.

The third information may be used to indicate the second terminal device to obtain the information list from the account server.

Optionally, after receiving the second information sent by the account server, the message push server sends response information of the second information to the account server. The response information of the second information is used to indicate that the message push server successfully receives the second information.

Optionally, if the account server does not receive the response information of the second information within sixth preset time, the account server re-sends the second information to the account server.

For example, after sending the second information to the message push server, the account server does not receive the response information of the second information within the sixth preset time (for example, 15 s). In this case, the account server re-sends the second information to the message push server.

Step 314: The second terminal device receives the third information sent by the message push server, and sends information for obtaining the information list to the account server.

The information for obtaining the information list may be used to obtain the information list from the account server. The information for obtaining the information list may include the identifier of the second terminal device.

Optionally, the second terminal device receives the third information sent by the message push server, and displays fourth prompt information in a user interface of the second terminal device; the second terminal device receives fourth acknowledgment information sent by the user; and the second terminal device sends the information for obtaining the information list to the account server.

The fourth prompt information may be used to notify the user that another device needs to push an information list to the second terminal device. The fourth acknowledgment information may be used to indicate the second terminal device to obtain the information list.

Figure 7:
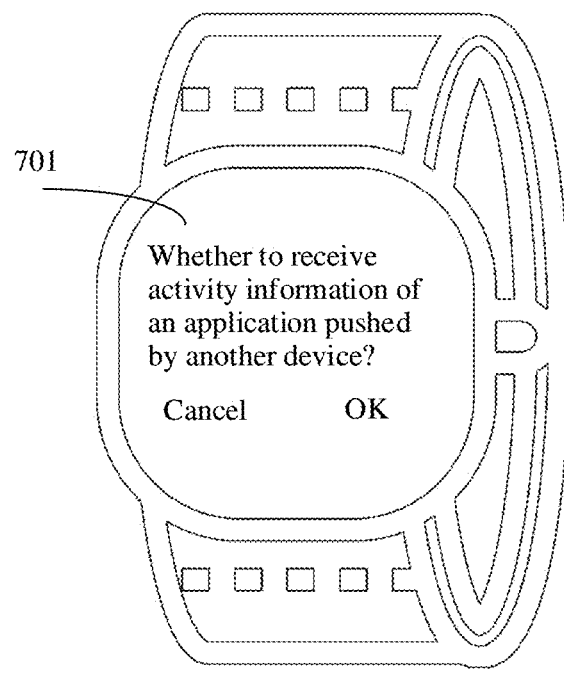
FIG. 7 is a schematic diagram 1 of a user interface of a second terminal device according to an embodiment of this application.

FIG. 7 is a schematic diagram of a user interface of a second terminal device. In FIG. 7, prompt information displayed in the user interface 701 is whether to receive activity information of an application pushed by another device.

If the user taps a cancel button, the second terminal device does not receive the activity information of the application pushed by the another device.

If the user clicks an OK button (in other words, the second terminal device receives the fourth acknowledgment information sent by the user), the second terminal device sends the information for obtaining the information list to the account server.

If the user performs no operation within seventh preset time, the second terminal device determines by default that the user taps the OK button, and the second terminal device sends the information list obtaining information to the account server. For example, if the user performs no operation within the seventh preset time (for example, 5 s), the second terminal device sends the information for obtaining the information list to the account server.

Step 315: The account server receives the information that is used for obtaining the information list and that is sent by the second terminal device, and sends the information list corresponding to the identifier of the second terminal device to the second terminal device.

Optionally, the account server receives the information that is used for obtaining the information list and that is sent by the second terminal device, obtains, based on the identifier of the second terminal device included in the information for obtaining the information list, the information list corresponding to the identifier of the second terminal device, and then sends the information list corresponding to the identifier of the second terminal device to the second terminal device.

Step 316: The second terminal device receives the information list that corresponds to the identifier of the second terminal device and that is sent by the account server.

Optionally, the second terminal device receives the information list that corresponds to the identifier of the second terminal device and that is sent by the account server, and displays the information list in the user interface of the second terminal device.

Figure 8:
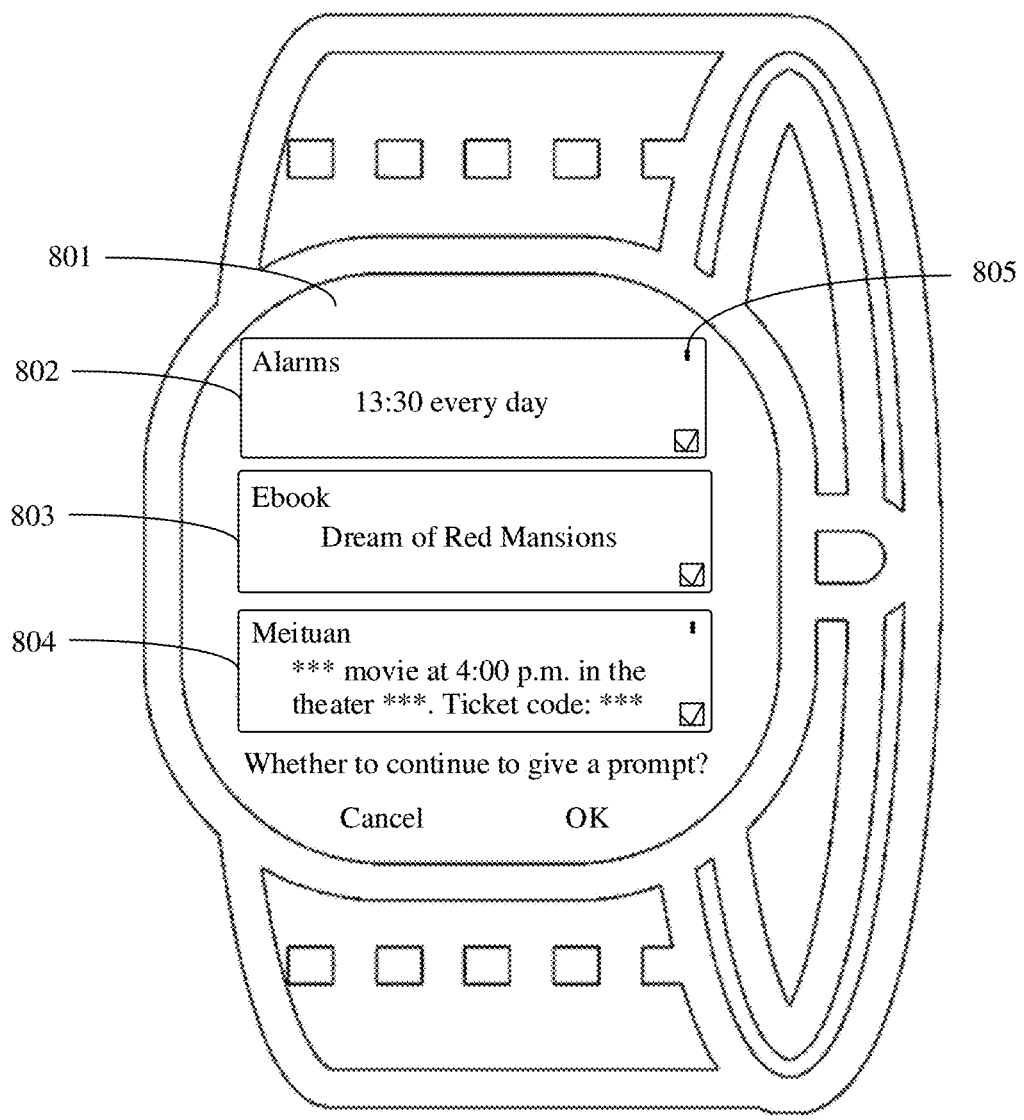
FIG. 8 is a schematic diagram 2 of a user interface of a second terminal device according to an embodiment of this application.

FIG. 8 is a schematic diagram of a user interface of a second terminal device. In FIG. 8, for example, the second terminal device displays the information list shown in FIG. 5 in the user interface 801, and prompt dialog boxes for three pieces of activity information are displayed in the user interface 801: a prompt dialog box 802 for the activity information of Alarms, a prompt dialog box 803 for the activity information of Ebook, and a prompt dialog box 804 for the activity information of Meituan. There is a check box in the lower right corner of each of the prompt dialog box 802 and the prompt dialog box 804, and the check box may be used for the user to select whether to continue to prompt activity information in a prompt dialog box in which the check box is located. The user may tap a prompt dialog box or tap an icon for viewing details in the upper right corner of the prompt dialog box, to view detailed activity information in the prompt dialog box. For example, the user may tap the prompt dialog box 803, to open the ebook Dream of Red Mansions, and may tap an icon 805 in the upper right corner of the prompt dialog box 802, to view the detailed activity information of Alarms, and to modify a ringing moment and frequency of the alarm.

For example, it is assumed that the user selects the prompt dialog box 804, but does not select the prompt dialog box 802 and the prompt dialog box 803, and taps an OK button in the user interface 801. Subsequently, the second terminal device prompts the activity information of Meituan before 4:00 p.m. (for example, at 3:30 p.m.). However, the second terminal device does not prompt the activity information of Alarms and the activity information of Ebook. Subsequently, if the user further wants to read the ebook Dream of Red Mansions, the user may open the ebook in a storage device of the first terminal device.

For example, if the user taps a cancel button in the user interface 801, subsequently, the second terminal device does not prompt the activity information of Alarms, the activity information of Ebook, or the activity information of Meituan.

For example, if the user performs no operation within eighth preset time, the second terminal device determines by default that the user selects the prompt dialog box 802 to the prompt dialog box 804 and taps the OK button in the user interface 801. Subsequently, the second terminal device opens the ebook Dream of Red Mansions to a location to which the user has read on the first terminal device, prompts the activity information of Alarms at 13:30, and prompts the activity information of Meituan before 4:00 p.m. (for example, at 3:30 p.m.).

Optionally, the second terminal device receives the information list that corresponds to the identifier of the second terminal device and that is sent by the account server, and prompts the user about the activity information before the activity time.

The following provides descriptions by using an example in which the information list corresponding to the identifier of the second terminal device includes the activity information shown in Table 2.

For example, the second terminal device receives the information list that corresponds to the identifier of the second terminal device and that is sent by the account server. The second terminal device opens the ebook Dream of Red Mansions to a location to which the user has read on the first terminal device, prompts the activity information of Alarms at 13:30, and prompts the activity information of Meituan before 4:00 p.m. (for example, at 3:30 p.m.).

It should be noted that if the first terminal device has established a Bluetooth connection to the second terminal device, the first terminal device may alternatively not perform step 311 to step 316, and the first terminal device may push the information list corresponding to the identifier of the second terminal device to the second terminal device through Bluetooth.

Optionally, the second terminal device receives, through Bluetooth, the information list that corresponds to the identifier of the second terminal device and that is sent by the first terminal device, and displays the information list in the user interface of the second terminal device.

For a specific process in which the second terminal device displays the information list in the user interface of the second terminal device, refer to corresponding descriptions in step 316. Details are not described herein again.

Optionally, the second terminal device receives, through Bluetooth, the information list that corresponds to the identifier of the second terminal device and that is sent by the first terminal device, and prompts the user about the activity information before the activity time.

For a specific process in which the second terminal device prompts the user about the activity information before the activity time, refer to corresponding descriptions in step 316. Details are not described herein again.

Based on the method shown in FIG. 3A and FIG. 3B, when detecting that the battery level of the first terminal device is less than or equal to the first threshold, the first terminal device may obtain the activity information of the application on the first terminal device, and push the activity information of the application to the second terminal device, where the second terminal device is the terminal device selected from the available device, the available device is the online device that uses the same user account as the first terminal device, and the battery level of the available device is greater than or equal to the second threshold. This can resolve a problem that the activity information of the application on the first terminal device cannot be obtained when the first terminal device runs out of power.

Figure 9:
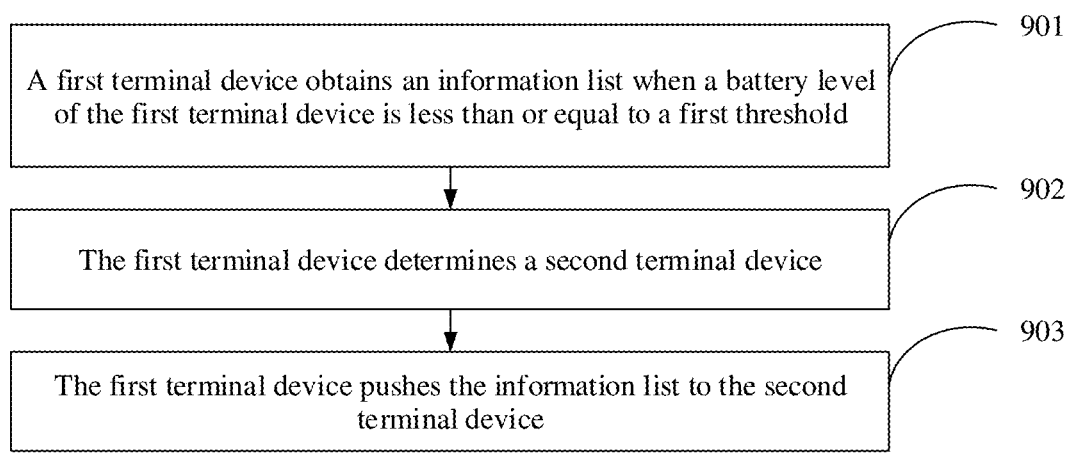
FIG. 9 is a schematic flowchart 2 of an information processing method according to an embodiment of this application.

The method shown in FIG. 3A and FIG. 3B is a detailed process of the information processing method. An embodiment of this application further provides an information processing method. As shown in FIG. 9, the information processing method includes step 901 to step 903.

Step 901: A first terminal device obtains an information list when a battery level of the first terminal device is less than or equal to a first threshold.

The information list may include activity information of an application on the first terminal device.

For a description that the battery level of the first terminal device is less than or equal to the first threshold, refer to the description in step 301 in the method shown in FIG. 3A and FIG. 3B. Details are not described herein again.

For a specific process in which the first terminal device obtains the information list, refer to descriptions in a first implementation scenario in this embodiment shown in FIG. 9.

Step 902: The first terminal device determines a second terminal device.

The second terminal device may be a terminal device selected from an available device, the available device may be an online device that uses a same user account as the first terminal device, and a battery level of the available device is greater than or equal to a second threshold.

For a specific process in which the first terminal device determines the second terminal device, refer to descriptions in a fourth implementation scenario in this embodiment shown in FIG. 9.

Step 903: The first terminal device pushes an information list to the second terminal device.

For a specific process in which the first terminal device pushes the information list to the second terminal device, refer to descriptions in a fifth implementation scenario in this embodiment shown in FIG. 9.

Based on the method shown in FIG. 9, when detecting that the battery level of the first terminal device is less than or equal to the first threshold, the first terminal device may obtain the activity information of the application on the first terminal device, and push the activity information of the application to the second terminal device, where the second terminal device is the terminal device selected from the available device, the available device is the online device that uses the same user account as the first terminal device, and the battery level of the available device is greater than or equal to the second threshold. This can resolve a problem that the activity information of the application on the first terminal device cannot be obtained when the first terminal device runs out of power.

Optionally, in the first implementation scenario in this embodiment shown in FIG. 9, that a first terminal device obtains an information list includes: The first terminal device obtains activity information of N applications on the first terminal device, where the activity information of the N applications includes activity locations, activity time, and activity content, and N is a positive integer. The first terminal device selects, from the activity information of the N applications, activity information including activity time that is within first preset time and an activity location that has a distance to a geographical location of the first terminal device less than or equal to a third threshold. The first terminal device obtains the information list based on the selected activity information.

For a specific process in the first implementation scenario in this embodiment shown in FIG. 9, refer to the descriptions in step 304 and step 305 in the method shown in FIG. 3A and FIG. 3B.

Based on the first implementation scenario in this embodiment shown in FIG. 9, the first terminal device may obtain the activity information of the N applications on the first terminal device, select, from the activity information of the N applications, the activity information including the activity time that is within the first preset time and the activity location that has the distance to the geographical location of the first terminal device less than or equal to the third threshold, and obtain the information list based on the selected activity information.

Optionally, in a second implementation scenario in this embodiment shown in FIG. 9, that the first terminal device obtains the information list based on the selected activity information includes: the first terminal device displays first prompt information in a user interface of the first terminal device, where the first prompt information is used to prompt a user about the activity information selected by the first terminal device. The first terminal device receives first acknowledgment information from the user, where the first acknowledgment information includes the information list.

For a specific process in the second implementation scenario in this embodiment shown in FIG. 9, refer to the descriptions in step 306 and step 307 in the method shown in FIG. 3A and FIG. 3B.

Based on the second implementation scenario in this embodiment shown in FIG. 9, the first terminal device may display, in the user interface of the first terminal device, the activity information selected by the first terminal device. The activity information autonomously selected by the user may be included in the information list.

Optionally, in a third implementation scenario in this embodiment shown in FIG. 9, before the first terminal device obtains the information list, the method shown in FIG. 9 further includes: The first terminal device displays second prompt information in the user interface of the first terminal device, where the second prompt information is used to prompt the user to push the information list to another terminal device. The first terminal device receives a second acknowledgment message from the user, where the second acknowledgment message is used to indicate the first terminal device to obtain the information list.

For a specific process in the third implementation scenario in this embodiment shown in FIG. 9, refer to the descriptions in step 302 and step 303 in the method shown in FIG. 3A and FIG. 3B.

Based on the third implementation scenario in this embodiment shown in FIG. 9, the first terminal device may display, in the user interface of the first terminal device, prompt information "This device has a low battery level. Whether to automatically push activity information of the application on this device to another available device", and determine, based on a selection of the user, whether to enable an intelligent application.

Optionally, in the fourth implementation scenario in this embodiment shown in FIG. 9, that the first terminal device determines a second terminal device includes: The first terminal device sends query information to an account server, where the query information is used to query for an available device. The first terminal device receives query response information sent by the account server, where the query response information includes a device list, and the device list includes information about the available device. The first terminal device determines the second terminal device based on the query response information.

For a specific process in the fourth implementation scenario in this embodiment shown in FIG. 9, refer to the descriptions in step 308 to step 310 in the method shown in FIG. 3A and FIG. 3B.

Based on the fourth implementation scenario in this embodiment shown in FIG. 9, the first terminal device may send the query information to the account server, and determine the second terminal device based on the received query response information sent by the account server.

Optionally, in the fifth implementation scenario in this embodiment shown in FIG. 9, That the first terminal device pushes an information list to the second terminal device includes: The first terminal device sends first information to the account server, where the first information includes the information list, the first information is used to indicate the account server to send second information to a message push server, the second information is used to indicate the message push server to send third information to the second terminal device, and the third information is used to indicate the second terminal device to obtain the information list from the account server; and the account server is configured to manage terminal devices that use the same user account, and the message push server is configured to push a message to a terminal device.

For a specific process in the fifth implementation scenario in this embodiment shown in FIG. 9, refer to the descriptions in step 311 to step 316 in the method shown in FIG. 3A and FIG. 3B.

Based on the fifth implementation scenario in this embodiment shown in FIG. 9, the first terminal device may send the first information to the account server, the account server sends the second information to the message push server, and the message push server sends the third information to the second terminal device, so that the second terminal device obtains the information list from the account server.

In the methods shown in FIG. 3A and FIG. 3B and FIG. 9, when detecting that the battery level of the first terminal device is less than or equal to the first threshold, the first terminal device starts the intelligent application, obtains the information list, determines the second terminal device, and then pushes the information list to the second terminal device. Alternatively, when detecting that the battery level of the first terminal device is less than or equal to the first threshold, the first terminal device may first determine whether there is an available device without starting a user interface of the intelligent application.

Figure 10A:
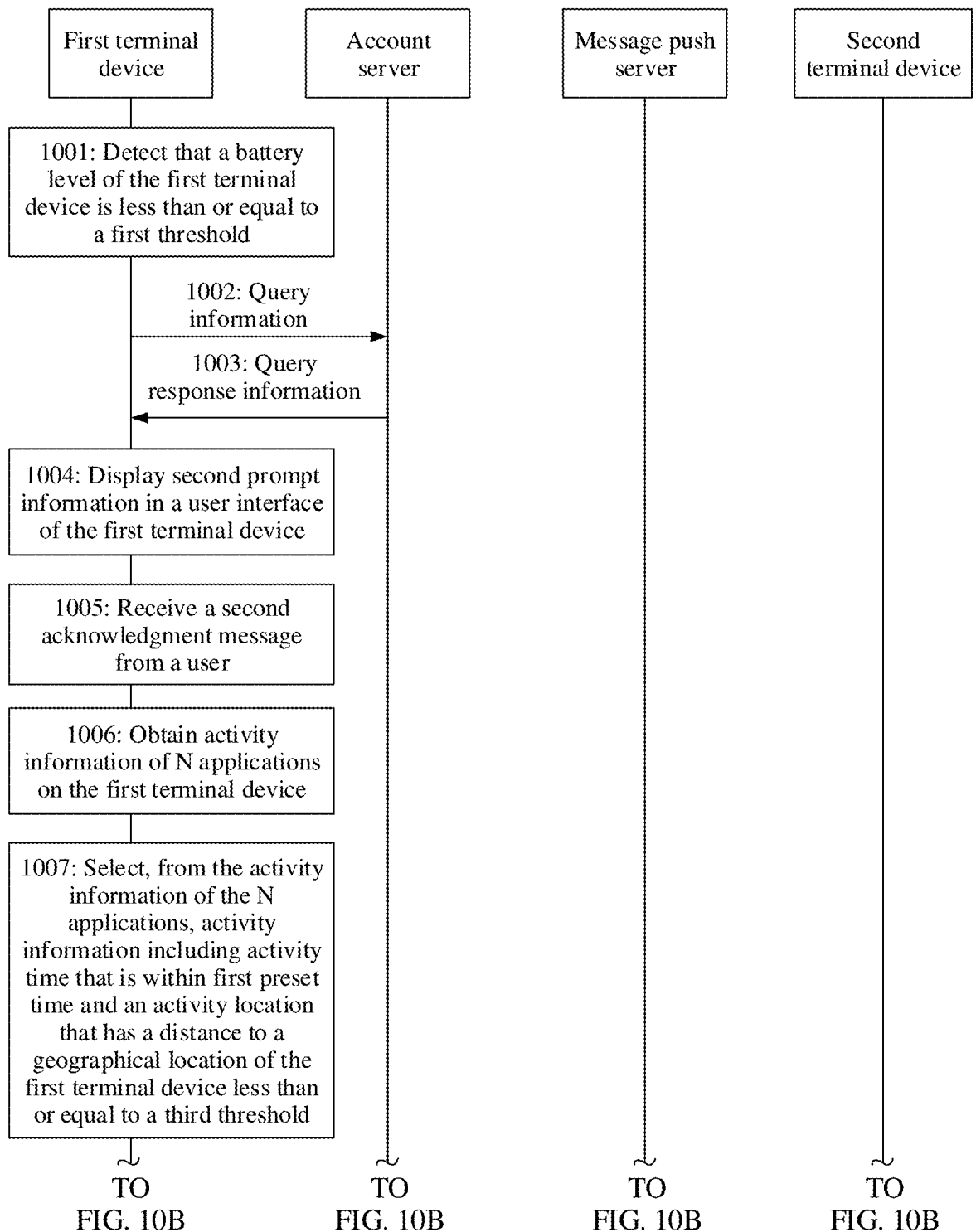
FIG. 10A and FIG. 10B are a schematic flowchart 3 of an information processing method according to an embodiment of this application.
Figure 10B:
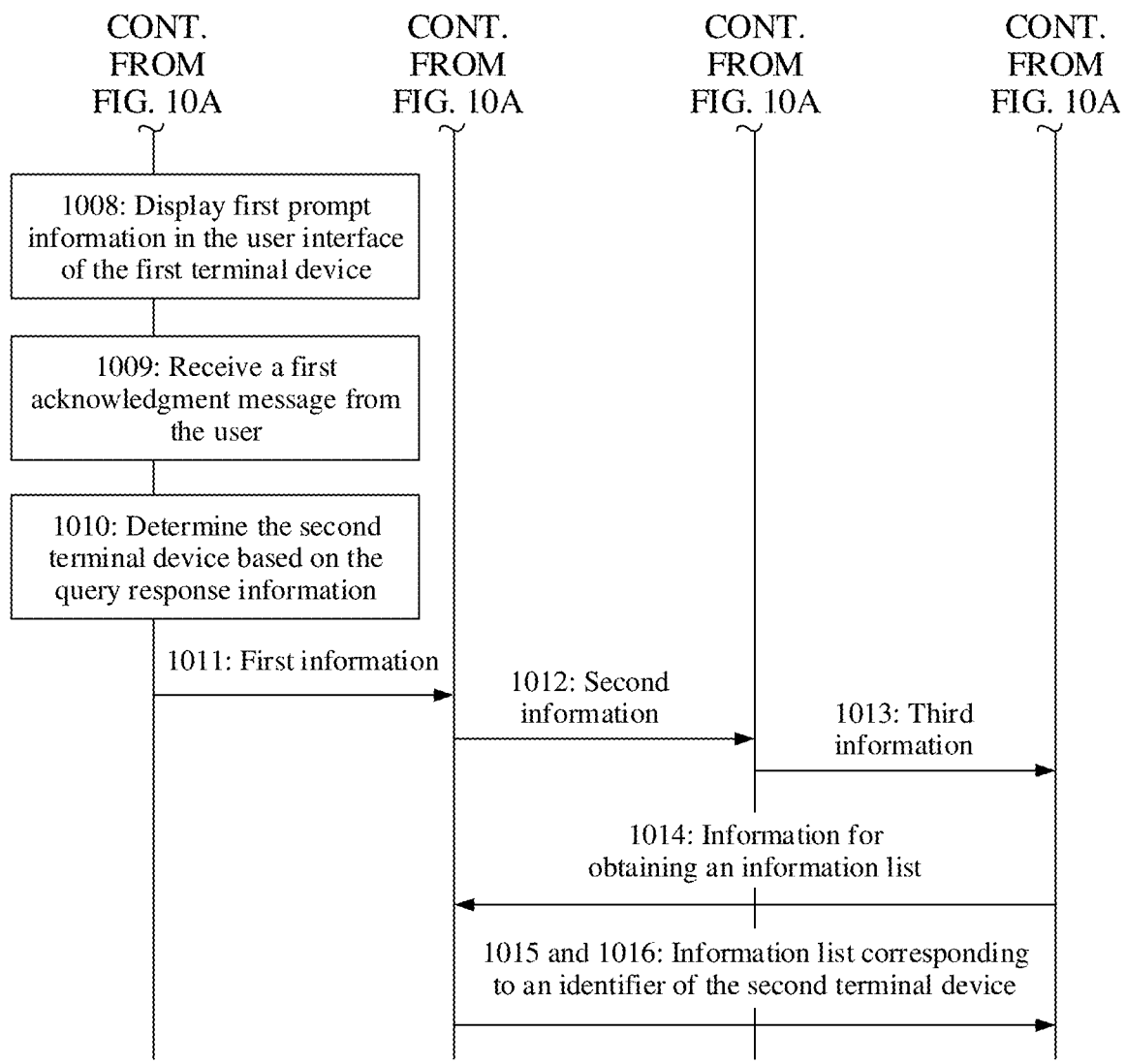

An embodiment of this application further provides an information processing method. As shown in FIG. 10A and FIG. 10B, the information processing method includes step 1001 to step 1016.

Step 1001: A first terminal device detects that a battery level of the first terminal device is less than or equal to a first threshold.

For a specific process of step 1001, refer to the descriptions in step 301. Details are not described herein again.

Step 1002: The first terminal device sends query information to an account server.

Step 1003: The account server receives the query information sent by the first terminal device, and sends query response information to the first terminal device.

For specific processes of step 1002 and step 1003, refer to the descriptions in step 308 and step 309. Details are not described herein again.

It should be noted that step 1002 and step 1003 may be performed when the first terminal device does not start a user interface of an intelligent application. For example, when the first terminal device detects that the battery level of the first terminal device is less than or equal to the first threshold, the first terminal device performs step 1002 and step 1003 in background.

Optionally, if the query response information includes information about an available device, the first terminal device starts the user interface of the intelligent application, and performs all or some of step 1004 to step 1016.

Optionally, if the query response information does not include information about an available device, the first terminal device does not start the user interface of the intelligent application, or the first terminal device starts the user interface of the intelligent application and prompts a user with "There is no available device. Please check whether another device has logged in or has a low battery level".

Step 1004: Display second prompt information in a user interface of the first terminal device.

Step 1005: The first terminal device receives a second acknowledgment message from the user.

Step 1006: The first terminal device obtains activity information of N applications on the first terminal device.

Step 1007: The first terminal device selects, from the activity information of the N applications, activity information including activity time that is within first preset time and an activity location that has a distance to the geographical location of the first terminal device less than or equal to a third threshold.

Step 1008: Display first prompt information in the user interface of the first terminal device.

Step 1009: The first terminal device receives first acknowledgment information from the user.

For specific processes of step 1004 to step 1009, refer to the descriptions in step 302 to step 307. Details are not described herein again.

Step 1010: The first terminal device receives the query response information sent by the account server, and determines a second terminal device based on the query response information.

Step 1011: The first terminal device sends first information to the account server.

Step 1012: The account server receives the first information sent by the first terminal device, and sends second information to a message push server.

Step 1013: The message push server receives the second information sent by the account server, and sends third information to the second terminal device.

Step 1014: The second terminal device receives the third information sent by the message push server, and sends information for obtaining an information list to the account server.

Step 1015: The account server receives the information that is used for obtaining the information list and that is sent by the second terminal device, and sends the information list corresponding to an identifier of the second terminal device to the second terminal device.

Step 1016: The second terminal device receives the information list that corresponds to the identifier of the second terminal device and that is sent by the account server.

For specific processes of step 1010 to step 1016, refer to the descriptions in step 310 to step 316. Details are not described herein again.

Based on the method shown in FIG. 10A and FIG. 10B, when detecting that the battery level of the first terminal device is less than or equal to the first threshold, the first terminal device may first query whether there is an available device; and if there is an available device, the first terminal device obtains activity information of an application on the first terminal device, and pushes the activity information of the application to the second terminal device, where the second terminal device is a terminal device selected from the available device, the available device is an online device that uses a same user account as the first terminal device, and a battery level of the available device is greater than or equal to a second threshold. This can resolve a problem that the activity information of the application on the first terminal device cannot be obtained when the first terminal device runs out of power.

The foregoing mainly describes the solutions provided in the embodiments of this application from a perspective of interaction between the network elements. It may be understood that, to implement the foregoing functions, the terminal device includes a corresponding hardware structure and/or software module for performing each function. A person skilled in the art should be easily aware that, in combination with the examples of units and algorithm operations described in the embodiments disclosed in this specification, this application can be implemented by using hardware or a combination of hardware and computer software. Whether a function is performed by using hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be other division manner in an actual implementation.

Figure 11:
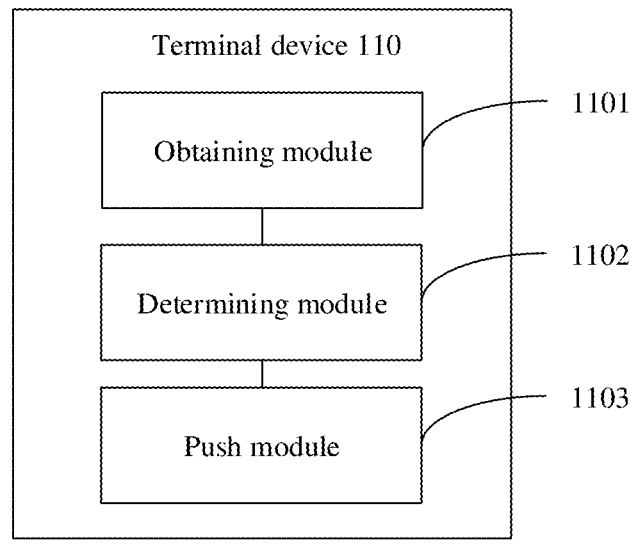
FIG. 11 is a schematic diagram 1 of a structure of a terminal device according to an embodiment of this application.

For example, the functional modules are obtained through division in an integrated manner. FIG. 11 is a schematic diagram of a structure of a terminal device 110. The terminal device 110 may be a first terminal device or a functional module, a chip, or the like that is in the first terminal device and that can perform the method performed by the first terminal device in this application. The terminal device 110 includes an obtaining module 1101, a determining module 1102, and a push module 1103.

The obtaining module 1101 is configured to obtain an information list when a battery level of the first terminal device is less than or equal to a first threshold, where the information list includes activity information of an application on the first terminal device.

The determining module 1102 is configured to determine a second terminal device, where the second terminal device is a terminal device selected from an available device, the available device is an online device that uses a same user account as the first terminal device, and a battery level of the available device is greater than or equal to a second threshold.

The push module 1103 is configured to push the information list to the second terminal device.

Optionally, the obtaining module 1101 is specifically configured to obtain activity information of N applications on the first terminal device, where the activity information of the N applications includes activity locations, activity time, and activity content, and N is a positive integer. The obtaining module 1101 is further specifically configured to select, from the activity information of the N applications, activity information including activity time that is within first preset time and an activity location that has a distance to a geographical location of the first terminal device less than or equal to a third threshold. The obtaining module 1101 is further specifically configured to obtain the information list based on the selected activity information.

Optionally, the obtaining module 1101 is further specifically configured to display first prompt information in a user interface of the first terminal device, where the first prompt information is used to prompt a user about the activity information selected by the first terminal device. The obtaining module 1101 is further specifically configured to receive first acknowledgment information from the user, where the first acknowledgment information includes the information list.

Optionally, the N applications are N frequently-used applications, or the N applications are N user-defined applications.

Figure 12:
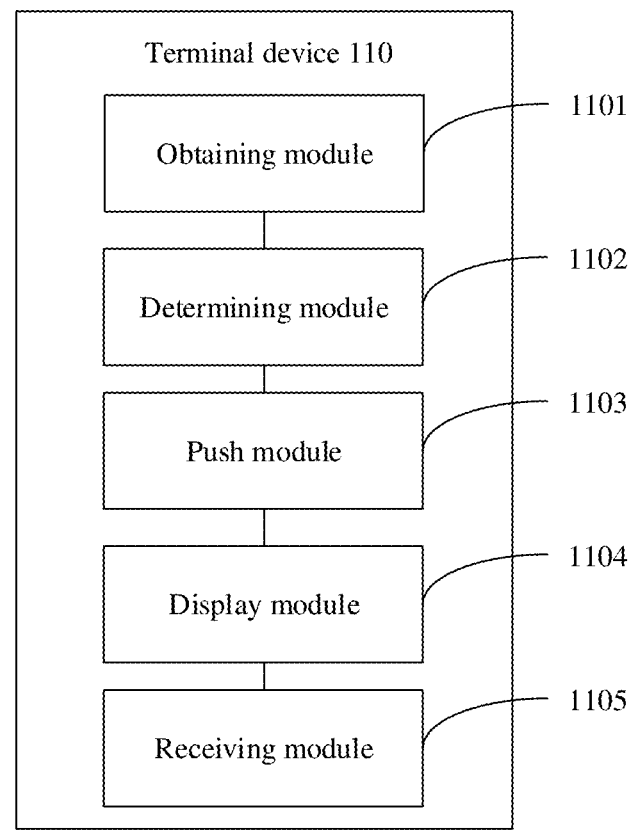
FIG. 12 is a schematic diagram 2 of a structure of a terminal device according to an embodiment of this application.

Optionally, as shown in FIG. 12, the terminal device 110 further includes a display module 1104 and a receiving module 1105.

The display module 1104 is configured to display second prompt information in the user interface of the first terminal device, where the second prompt information is used to prompt the user to push the information list to another terminal device.

The receiving module 1105 is configured to receive a second acknowledgment message from the user, where the second acknowledgment message is used to indicate the first terminal device to obtain the information list.

Optionally, the determining module 1102 is specifically configured to send query information to an account server, where the query information is used to query for an available device. The determining module 1102 is further specifically configured to receive query response information sent by the account server, where the query response information includes a device list, and the device list includes information about the available device. The determining module 1102 is further specifically configured to determine the second terminal device based on the query response information.

Optionally, the determining module 1102 is further specifically configured to: if the device list includes information about one available device, and a battery level of the available device is greater than or equal to the second threshold, determine that the available device is the second terminal device; or the determining module 1102 is further specifically configured to: if the device list includes information about two or more available devices, determine the second terminal device based on geographical locations of the two or more available devices and/or battery levels of the two or more available devices.

Optionally, the push module 1103 is specifically configured to send first information to the account server, where the first information includes the information list, the first information is used to indicate the account server to send second information to a message push server, the second information is used to indicate the message push server to send third information to the second terminal device, and the third information is used to indicate the second terminal device to obtain the information list from the account server; and the account server is configured to manage terminal devices that use the same user account, and the message push server is configured to push a message to a terminal device.

It should be noted that the terminal device 110 may further include a radio frequency circuit. Specifically, the terminal device 110 may send or receive a wireless signal by using the radio frequency circuit. The radio frequency circuit usually includes but is not limited to an antenna, at least one amplifier, a transceiver, a coupler, a low noise amplifier, a duplexer, or the like. In addition, the radio frequency circuit may further communicate with another device through wireless communication. The wireless communication may be implemented according to any communications standard or protocol, including but not limited to a global system for mobile communications, a general packet radio service, code division multiple access, wideband code division multiple access, long term evolution, an email, a short message service, or the like.

All related content of the operations in the foregoing method embodiments may be cited in function description of the corresponding functional modules. Details are not described herein again.

In this embodiment, the terminal device 110 is presented in a form of functional modules obtained through division in an integrated manner. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the terminal device 110 may be in a form shown in FIG. 2.

For example, the processor 220 in FIG. 2 may invoke computer-executable instructions stored in the internal memory 221, to enable the terminal device 110 performs the information processing method in the foregoing method embodiments.

For example, functions/implementation processes of the obtaining module 1101, the determining module 1102, the push module 1103, the display module 1104, and the receiving module 1105 in FIG. 12 may be implemented by the processor 220 in FIG. 2 by invoking the computer-executable instructions stored in the internal memory 221. Alternatively, functions/implementation processes of the obtaining module 1101, the determining module 1102, and the display module 1104 in FIG. 12 may be implemented by the processor 220 in FIG. 2 by invoking the computer-executable instructions stored in the internal memory 221, and functions/implementation processes of the push module 1103 and the receiving module 1105 in FIG. 12 may be implemented by the antenna 1 in FIG. 2.

The terminal device 110 provided in this embodiment can perform the foregoing information processing method. Therefore, for a technical effect that can be achieved by the terminal device 110, refer to descriptions in the foregoing method embodiments. Details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement other variations of the disclosed embodiments by viewing the accompanying drawings, disclosed content, and the appended claims. In the claims, "comprise" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, this specification and the accompanying drawings are merely descriptions of examples of this application defined by the appended claims, and are intended to cover any of or all modifications, variations, combinations, or equivalents within the scope of this application. It is clear that a person skilled in the art can make various modifications and variations to this application without departing from the spirit and scope of this application. This application is intended to cover these modifications and variations of this application provided that they fall within the scope of protection defined by the following claims of this application and their equivalent technologies.

What is claimed is:

1. An information processing method, wherein the method comprises:

obtaining, by a first terminal device, an information list when a battery level of the first terminal device is less than or equal to a first threshold, wherein the information list comprises activity information of an application on the first terminal device, wherein the obtaining, by the first terminal device, the information list comprises:

obtaining, by the first terminal device, activity information of N applications on the first terminal device, wherein the activity information of the N applications comprises activity locations, activity time, and activity content, and N is a positive integer;

determining, by the first terminal device, a second terminal device, wherein the second terminal device is a terminal device selected from an available device, the available device is an online device that uses a same user account as the first terminal device, and a battery level of the available device is greater than or equal to a second threshold; and pushing, by the first terminal device, the information list to the second terminal device.

2. The method according to claim 1, wherein the obtaining, by the first terminal device, the information list further comprises:

selecting, by the first terminal device from the activity information of the N applications, activity information comprising activity time that is within first preset time and an activity location that has a distance to a geographical location of the first terminal device less than or equal to a third threshold; and obtaining, by the first terminal device, the information list based on the selected activity information.

3. The method according to claim 2, wherein the obtaining, by the first terminal device, the information list based on the selected activity information comprises:

displaying first prompt information in a user interface of the first terminal device, wherein the first prompt information is used to prompt a user about the activity information selected by the first terminal device; and receiving, by the first terminal device, first acknowledgment information from the user, wherein the first acknowledgment information comprises the information list.

4. The method according to claim 2, wherein
the N applications are N frequently-used applications; or
the N applications are N user-defined applications.

5. The method according to claim 1, wherein before the obtaining, by a first terminal device, an information list, the method further comprises:

displaying second prompt information in the user interface of the first terminal device, wherein the second prompt information is used to prompt the user to push the information list to another terminal device; and receiving, by the first terminal device, a second acknowledgment message from the user, wherein the second acknowledgment message is used to indicate the first terminal device to obtain the information list.

6. The method according to claim 1, wherein the determining, by the first terminal device, a second terminal device comprises:

sending, by the first terminal device, query information to an account server, wherein the query information is used to query for an available device;

receiving, by the first terminal device, query response information sent by the account server, wherein the query response information comprises a device list, and the device list comprises information about the available device; and determining, by the first terminal device, the second terminal device based on the query response information.

7. The method according to claim 6, wherein the determining, by the first terminal device, the second terminal device based on the query response information comprises:

if the device list comprises information about one available device, and a battery level of the available device is greater than or equal to the second threshold, determining, by the first terminal device, that the available device is the second terminal device; or if the device list comprises information about two or more available devices, determining, by the first terminal device, the second terminal device based on geographical locations of the two or more available devices and/or battery levels of the two or more available devices.

8. The method according to claim 1, wherein the pushing, by the first terminal device, the information list to the second terminal device comprises:

sending, by the first terminal device, first information to the account server, wherein the first information comprises the information list, the first information is used to indicate the account server to send second information to a message push server, the second information is used to indicate the message push server to send third information to the second terminal device, and the third information is used to indicate the second terminal device to obtain the information list from the account server; and the account server is configured to manage terminal devices that use a same user account, and the message push server is configured to push a message to a terminal device.

9. A first terminal device, wherein the first terminal device comprises a processor and a communications interface;

the processor is configured to obtain an information list when a battery level of the first terminal device is less than or equal to a first threshold, wherein the information list comprises activity information of an application on the first terminal device;

the processor is further configured to obtain activity information of N applications on the first terminal device, wherein the activity information of the N applications comprises activity locations, activity time, and activity content, and N is a positive integer;

the processor is further configured to determine a second terminal device, wherein the second terminal device is a terminal device selected from an available device, the available device is an online device that uses a same user account as the first terminal device, and a battery level of the available device is greater than or equal to a second threshold; and the communications interface is configured to push the information list to the second terminal device.

10. The first terminal device according to claim 9, wherein the processor is further specifically configured to select, from the activity information of the N applications, activity information comprising activity time that is within first preset time and an activity location that has a distance to a geographical location of the first terminal device less than or equal to a third threshold; and the processor is further specifically configured to obtain the information list based on the selected activity information.

11. The first terminal device according to claim 10, wherein the processor is further specifically configured to display first prompt information in a user interface of the first terminal device, wherein the first prompt information is used to prompt a user about the activity information selected by the first terminal device; and the processor is further specifically configured to receive first acknowledgment information from the user, wherein the first acknowledgment information comprises the information list.

12. The first terminal device according to claim 10, wherein the N applications are N frequently-used applications; or
the N applications are N user-defined applications.

13. The first terminal device according to claim 9, wherein the processor is further configured to display second prompt information in the user interface of the first terminal device, wherein the second prompt information is used to prompt the user to push the information list to another terminal device; and the communications interface is further configured to receive a second acknowledgment message from the user, wherein the second acknowledgment message is used to indicate the first terminal device to obtain the information list.

14. The first terminal device according to claim 9, wherein the processor is specifically configured to send query information to an account server, wherein the query information is used to query for an available device;

the processor is further specifically configured to receive query response information sent by the account server, wherein the query response information comprises a device list, and the device list comprises information about the available device; and the processor is further specifically configured to determine the second terminal device based on the query response information.

15. The first terminal device according to claim 14, wherein the processor is further specifically configured to: if the device list comprises information about one available device, and a battery level of the available device is greater than or equal to the second threshold, determine that the available device is the second terminal device; or the processor is further specifically configured to: if the device list comprises information about two or more available devices, determine the second terminal device based on geographical locations of the two or more available devices and/or battery levels of the two or more available devices.

16. The first terminal device according to claim 9, wherein the communications interface is specifically configured to send first information to the account server, wherein the first information comprises the information list, the first information is used to indicate the account server to send second information to a message push server, the second information is used to indicate the message push server to send third information to the second terminal device, and the third information is used to indicate the second terminal device to obtain the information list from the account server; and the account server is configured to manage terminal devices that use a same user account, and the message push server is configured to push a message to a terminal device.

17. A computer-readable storage medium, comprising non-transitory instructions, wherein at least one apparatus is enabled to perform the method according to claim 1 in response to the non-transitory instructions being executed on the at least one apparatus, and the at least one apparatus having a processor.

\* \* \* \* \*